United States Patent
Clark et al.

(10) Patent No.: US 10,273,842 B2
(45) Date of Patent: Apr. 30, 2019

(54) TWO-PART STRUCTURAL OIL PAN

(71) Applicant: CUMMINS INC., Columbus, IN (US)

(72) Inventors: Mathew A. Clark, Auckland (NZ); William A. Pearce, Cleveland (GB); Navdeep Kumar Jindal, Mansa (IN); Ryan T. Wainwright-Fisher, Crieff (GB); Ian Watson, Darlington (GB); Edward Tarn Bainbridge, Darlington (GB); Jonathan M. Atkinson, North Yorkshire (GB); Andrew Skinner, Washington (GB); Paul Andrew Leggott, Darlington (GB)

(73) Assignee: Cummins Inc., Columbus, IN (US)

( * ) Notice: Subject to any disclaimer, the term of this patent is extended or adjusted under 35 U.S.C. 154(b) by 163 days.

(21) Appl. No.: 15/433,995

(22) Filed: Feb. 15, 2017

(65) Prior Publication Data

US 2017/0234177 A1    Aug. 17, 2017

Related U.S. Application Data

(60) Provisional application No. 62/295,376, filed on Feb. 15, 2016.

(51) Int. Cl.
  *F16M 1/00* (2006.01)
  *F01M 11/00* (2006.01)
  *F16H 57/04* (2010.01)
(52) U.S. Cl.
  CPC ..... *F01M 11/0004* (2013.01); *F16H 57/0452* (2013.01); *F01M 2011/0054* (2013.01); *F01M 2011/0058* (2013.01)

(58) Field of Classification Search
  CPC ....... F01M 11/0004; F01M 2011/0058; F01M 2011/0054; F16H 57/0452
  See application file for complete search history.

(56) References Cited

U.S. PATENT DOCUMENTS

| | | | | |
|---|---|---|---|---|
| 2,781,750 | A * | 2/1957 | Chayne | F02F 7/0012 123/184.32 |
| 4,633,961 | A * | 1/1987 | Niskanen | B62D 5/062 123/198 R |
| 4,770,276 | A * | 9/1988 | Takubo | F01M 11/0004 123/195 C |
| 4,793,299 | A * | 12/1988 | Ishimura | F02F 7/008 123/195 A |
| 4,831,978 | A * | 5/1989 | Iguchi | F02F 7/0053 123/195 H |
| 4,848,293 | A * | 7/1989 | Sasada | F01M 11/0004 123/195 C |

(Continued)

FOREIGN PATENT DOCUMENTS

DE    10014727 C1 * 10/2001    ......... F01M 11/0004
JP    62247158 A  * 10/1987
(Continued)

*Primary Examiner* — Hung Q Nguyen
(74) *Attorney, Agent, or Firm* — Faegre Baker Daniels LLP

(57) ABSTRACT

An oil pan assembly including a first portion having an inner set of openings configured to receive a first set of fasteners to couple the first portion to an engine block and a second portion having an outer set of openings positioned laterally outward relative to the inner set of openings and configured to receive a second set of fasteners to couple the second portion to the first portion and the engine block.

20 Claims, 30 Drawing Sheets

(56) References Cited

U.S. PATENT DOCUMENTS

| | | | | |
|---|---|---|---|---|
| 5,038,890 | A * | 8/1991 | Tanaka | F01M 11/0004 123/196 R |
| 6,374,794 | B1 * | 4/2002 | Dudemaine | F01M 11/0004 123/195 H |
| 7,219,642 | B1 * | 5/2007 | Kwiatkowski | F01M 11/0004 123/195 C |
| 8,347,844 | B2 * | 1/2013 | Jessberger | F01M 11/0004 123/195 A |
| 2003/0029412 | A1 * | 2/2003 | Kato | F01M 5/02 123/195 C |
| 2004/0069265 | A1 * | 4/2004 | Pierro | F01M 11/0004 123/196 R |
| 2008/0264727 | A1 * | 10/2008 | Nagano | F01M 11/0004 184/106 |
| 2010/0288223 | A1 * | 11/2010 | Huenink | B62D 21/11 123/195 C |
| 2015/0123392 | A1 * | 5/2015 | Fedotov | F01M 11/0004 280/781 |
| 2015/0240676 | A1 * | 8/2015 | Fedotov | F01M 11/0004 123/196 R |
| 2015/0240698 | A1 * | 8/2015 | Nishimura | F01N 13/1805 60/278 |

FOREIGN PATENT DOCUMENTS

| | | | | | |
|---|---|---|---|---|---|
| JP | 63068756 | A | * | 3/1988 | ............ F02F 7/0053 |
| JP | 63154845 | A | * | 6/1988 | |
| JP | 05306654 | A | * | 11/1993 | ......... F01M 11/0004 |

* cited by examiner

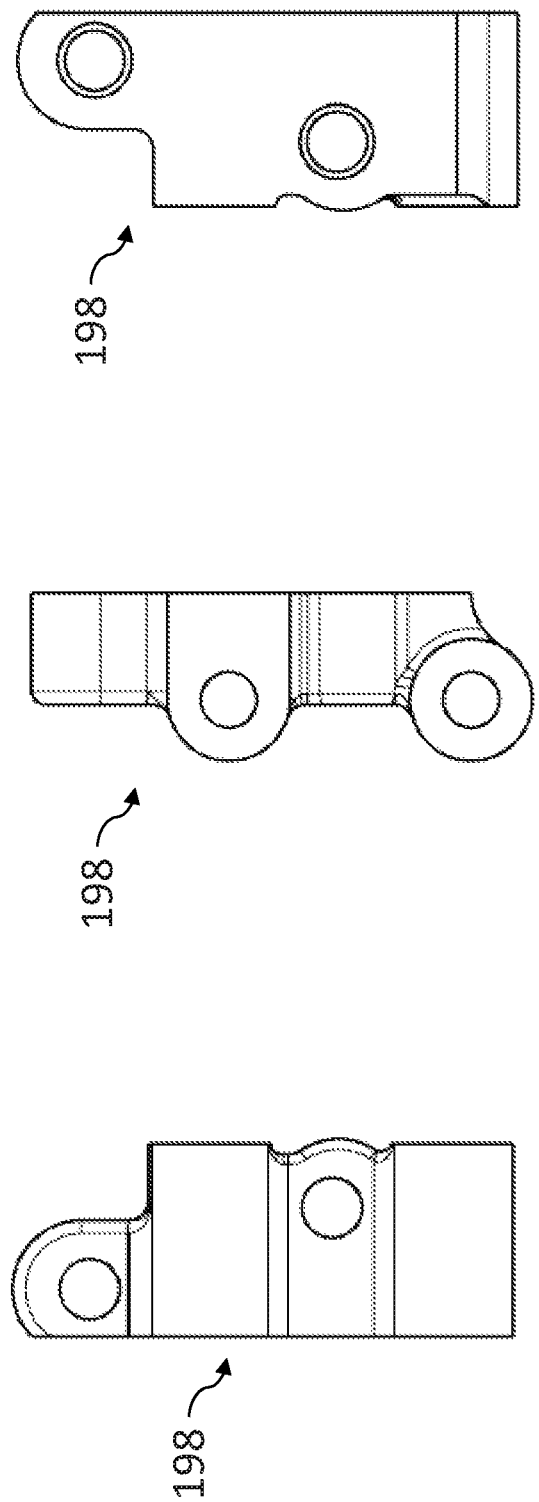

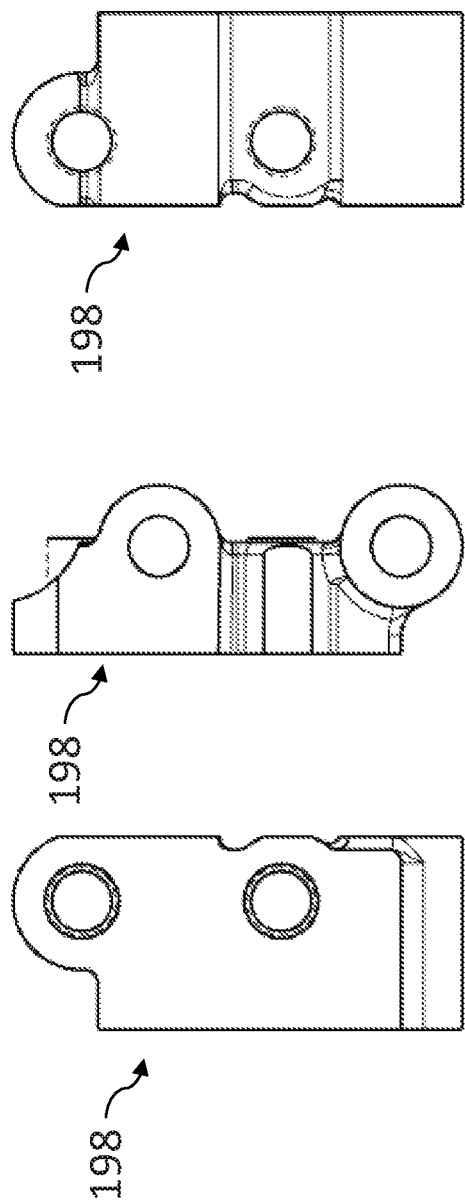

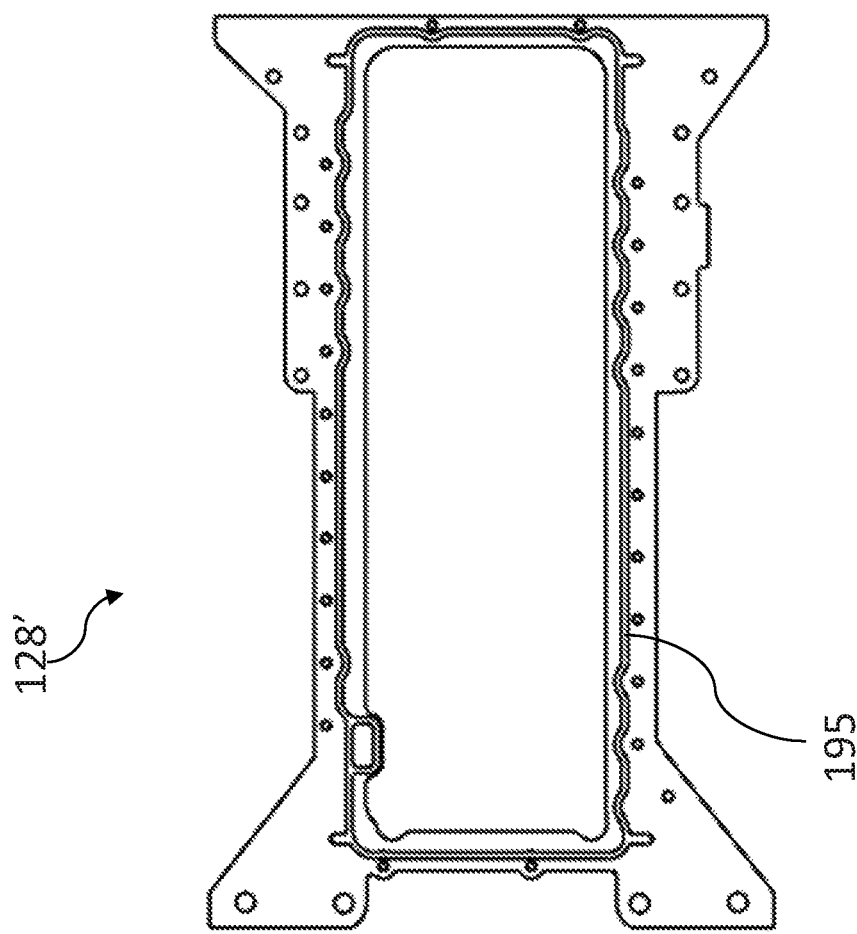

TWO-PART STRUCTURAL OIL PAN

RELATED APPLICATIONS

This application claims priority to U.S. Provisional Patent Application Ser. No. 62/295,376, filed Feb. 15, 2016, titled "Two-Part Structural Oil Pan," to Clark et al., the entire disclosure of which is expressly incorporated by reference herein.

TECHNICAL FIELD OF THE DISCLOSURE

The present disclosure relates to an oil pan, and more particularly, to a two-part oil pan configured to optimize strength and load transfer.

BACKGROUND OF THE DISCLOSURE

Generally, in agricultural tractors, it is preferred that an engine act as part of the chassis for the tractor. As a result, the loads incurred by the tractor are transferred through the engine block and oil pan of the engine. To withstand the loads incurred, the engine block and oil pan need to be sufficiently strong. When a standard engine block is used on a tractor, an extra strong oil pan may be desirable. Therefore, there is a need for a more stable oil pan that optimizes strength and load transfer, and can compensate for the structural weakness of a standard engine block.

SUMMARY OF THE DISCLOSURE

In one embodiment of the present disclosure, an oil pan assembly for an agricultural tractor includes a first portion and a second portion. The first portion of the oil pan assembly has an inner set of openings configured to receive a first set of fasteners to couple the first portion to an engine block. Additionally, the second portion of the oil pan assembly has an outer set of openings positioned laterally outward relative to the inner set of openings and is configured to receive a second set of fasteners to couple the second portion to the first portion and the engine block.

In one aspect of the oil pan assembly, at least one of the first portion and the second portion are further coupled to at least one of an axle carrier and a flywheel housing.

In another aspect of the oil pan assembly, at least one of the first portion and the second portion are further coupled to at least one of an axle carrier and a transmission.

In another aspect of the oil pan assembly, the first portion also includes a first end, a second end and a middle section. The middle section of the first end is configured to have a width less than a width of the first end and less than a width of the second end.

In another aspect of the oil pan assembly, the second portion also includes a first end, a second end and a middle section. The middle section is configured to have a width less than at least one of a width of the first end of the second portion and a width of the second end of the second portion.

In a further aspect of the oil pan assembly, the first portion further includes an interior portion that has a plurality of openings.

In another embodiment of the present disclosure, an oil pan assembly includes a first portion and a second portion. The first portion is coupled to an engine block, an axle carrier and at least one of a flywheel housing and a transmission of a powertrain, and the second portion is coupled to the first portion and at least one of the engine block, the axle carrier and the at least one of the flywheel housing and the transmission.

In one aspect of the oil pan assembly, the first portion is coupled to the engine block, the axle carrier and the flywheel housing.

In another aspect of the oil pan assembly, the first portion is coupled to the engine block, the axle carrier and the transmission.

In another aspect of the oil pan assembly, the second portion is coupled to the engine block, the axle carrier and the flywheel housing.

In another aspect of the oil pan assembly, the second portion is coupled to the engine block, the axle carrier and the transmission.

In a further aspect of the oil pan assembly, the first portion includes an interior portion having a plurality of openings.

In another aspect of the oil pan assembly, the first portion comprises a first end having at least a portion extending away from the first portion.

In a further aspect of the oil pan assembly, the first end of the first portion has a U-shaped cross-section.

In a further embodiment of the present disclosure, a powertrain assembly includes an engine comprising an engine block, an axle carrier positioned forward of the engine, at least one of a flywheel housing and a transmission, and an oil pan assembly comprising a first portion and a second portion. The first portion and the second portion are coupled to the engine block, the axle carrier and the at least one of the flywheel housing and the transmission.

In one aspect of the powertrain assembly, the flywheel housing is positioned rearward of the engine.

In another aspect of the powertrain assembly, the transmission is positioned rearward of the engine.

In a further aspect of the powertrain assembly, the first portion is positioned between the engine block and the second portion.

In another aspect of the powertrain assembly, the first portion of the oil pan assembly includes an interior portion having a plurality of openings.

In a further aspect of the powertrain assembly, a first end of the first portion has a U-shaped cross-section.

BRIEF DESCRIPTION OF THE DRAWINGS

Advantages and features of the embodiments of this disclosure will become more apparent from the following detailed description of exemplary embodiments when viewed in conjunction with the accompanying drawings, wherein:

FIG. 18A shows front view of the left-side bracket of FIG. 18;

FIG. 18B shows side view of the left-side bracket of FIG. 18;

FIG. 18C shows back view of the left-side bracket of FIG. 18;

FIG. 18D shows top view of the left-side bracket of FIG. 18;

FIG. 18E shows bottom view of the left-side bracket of FIG. 18;

FIG. 19A shows front view of the left-side bracket of FIG. 19;

FIG. 19B shows side view of the left-side bracket of FIG. 19;

FIG. 19C shows back view of the left-side bracket of FIG. 19;

FIG. 19D shows top view of the left-side bracket of FIG. 19;

FIG. 19E shows bottom view of the left-side bracket of FIG. 19;

FIG. 29 shows a top view of the second gasket of FIG. 28.

DETAILED DESCRIPTION OF THE DRAWINGS

The embodiments disclosed below are not intended to be exhaustive or limit the disclosure to the precise form disclosed in the following detailed description. Rather, the embodiments are chosen and described so that others skilled in the art may utilize its teachings.

Figure 1:
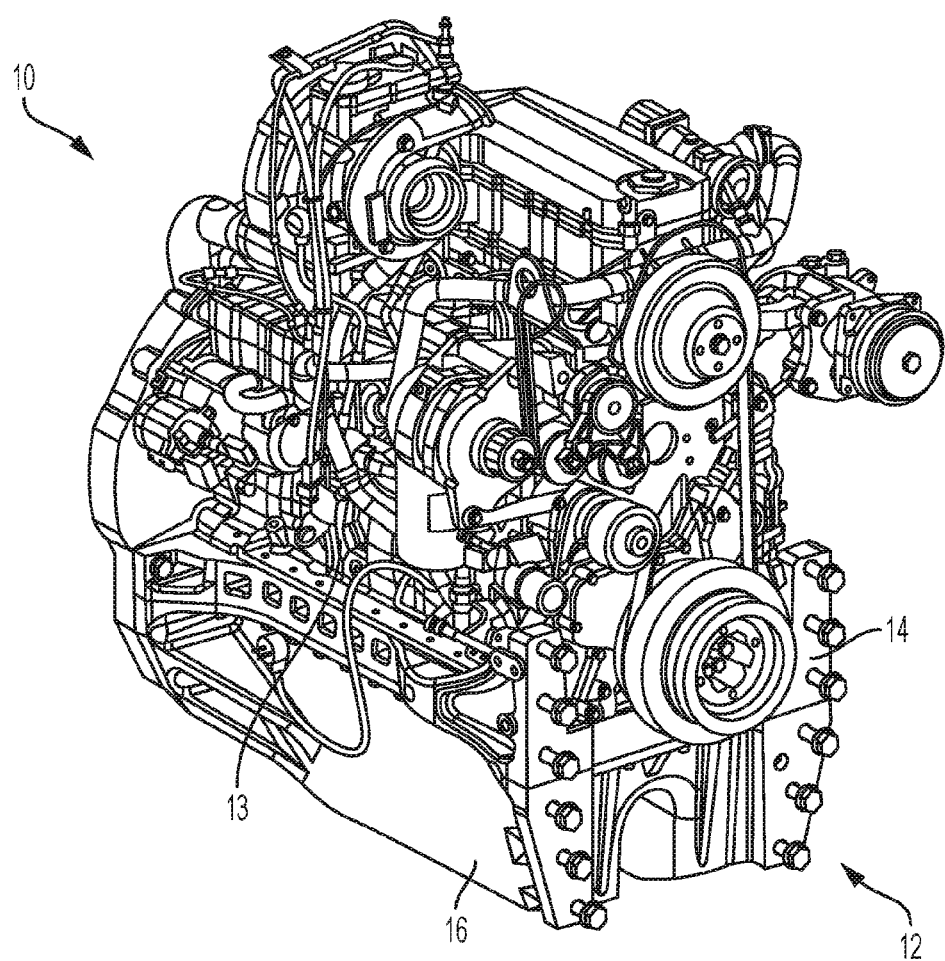
FIG. 1 is a perspective view of an engine comprising an embodiment of an oil pan assembly of the present disclosure.

Referring to FIG. 1, an engine 10 of the present disclosure generally includes an engine block 13 and an oil pan assembly 12 having a first portion 14 and a second portion 16.

Figure 2:
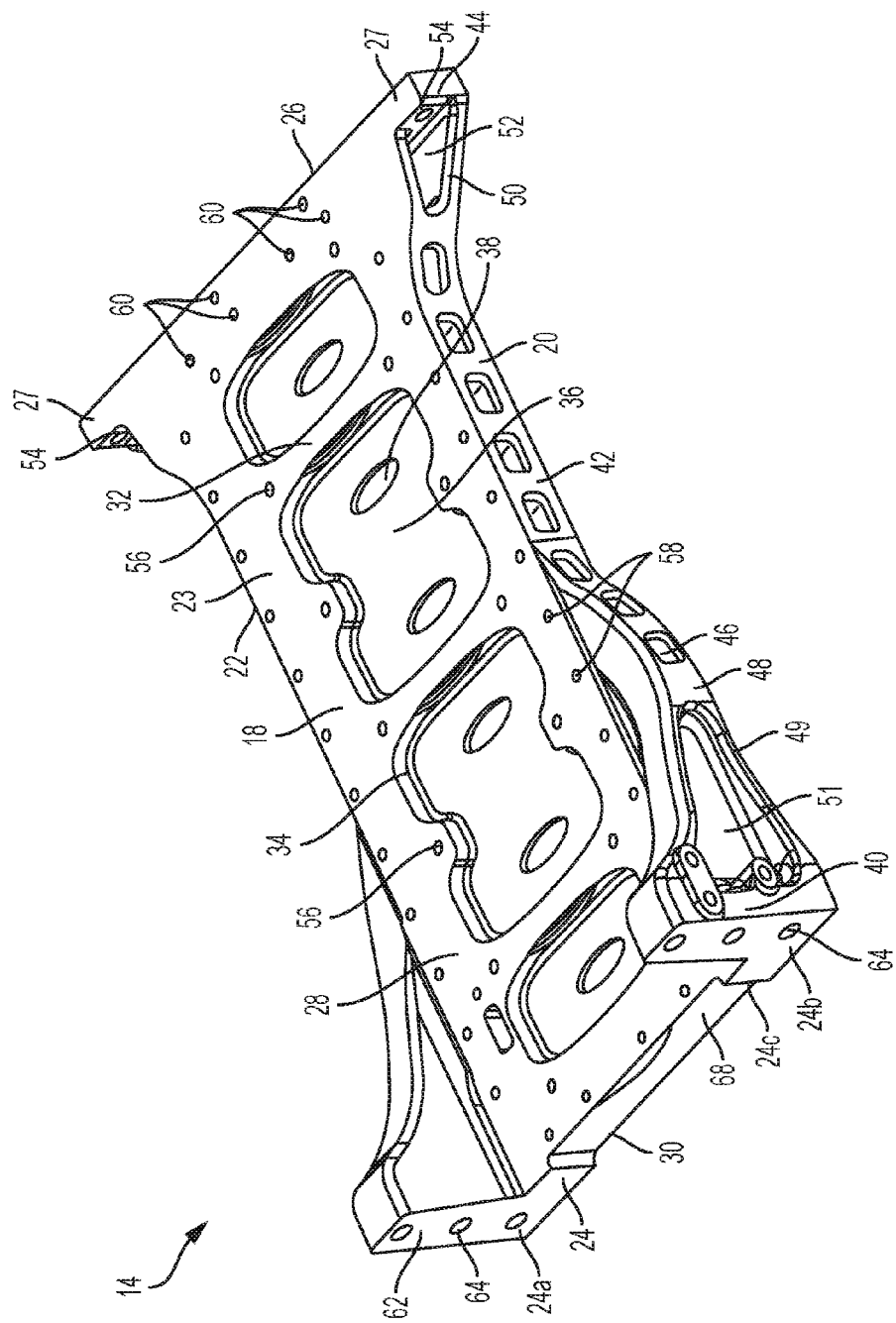
FIG. 2 shows a perspective view of a first portion of the oil pan assembly of FIG. 1.

Referring to FIG. 2, first portion 14 generally includes a body 18 having a pair of sides 20, 22, a first end 24, a second end 26, a top surface 28, and a bottom surface 30. In various embodiments, first portion 14 may further include at least one interior wall 32 extending from side 20 to side 22, wherein interior wall 32 creates a plurality of openings 34 through first portion 14. Additionally, in various embodiments, the plurality of openings 34 may include an interior portion 36 extending across opening 34, wherein interior portion 36 may include an opening 38 such that an engine lubricant (not shown) may pass from engine 10 through opening 38 of first portion 14 into second portion 16. Furthermore, in various embodiments, interior wall(s) 32 and interior portion(s) 36 may comprise at least a portion of a bedplate of engine 10. The bedplate helps strengthen oil pan assembly 12 by increasing the torsional stiffness of oil pan assembly 12 and allows oil pan assembly 12 to take on greater loads.

As side walls 20 and 22 of first portion 14 are substantially the same, only side wall 20 is described in detail herein. Side wall 20 includes a first end 40 connected to first end 24, a second end 44 connected to second end 26 and a middle portion 42 extending from first end 40 to second end 44. In various embodiments, side wall 20 may further include a plurality of openings 46 spaced along side wall 20. Additionally, in various embodiments, side wall 20 may include a first extended portion 48 that extends outwardly from middle portion 42 of side wall 20 to first end 40 of side wall 20. In an exemplary embodiment, first extended portion 48 may also extend vertically at a gradual incline to first end 40 of side 20. Furthermore, in various embodiments, the vertical extension of first extended portion 48 may begin at a middle portion 49 of first extended portion 48. Additionally, first extended portion 48 may include an outer surface 49 having an indentation 51. Side wall 20 may also include a second extended portion 50 that extends outward from middle portion 42 of side wall 20 to second end 44 of side wall 20. In various embodiments, second extended portion 50 may include an opening 52 such that a coupling opening 54 may extend through end wall 26 of first portion 14, and be accessed from side 20. Coupling opening 54 may be configured to receive a fastener 55 to couple a component of powertrain assembly 11 to first portion 14 (see FIG. 10). Due to extended portions 48 and/or 50, the width between middle portions 42 of side walls 20 and 22 may be less than a width of first end 24 and a width of second end 26.

As top surface 28 and bottom surface 30 of first portion 14 are substantially the same, only top surface 28 is described in detail herein. Top surface 28 of first portion 14 generally includes an inner set of openings 56 configured to receive a first set of fasteners 57 (FIG. 8) to couple first portion 14 to engine block 13, wherein openings 56 extend between top surface 28 and bottom surface 30. Top surface 28 further includes an outer set of openings 58 positioned laterally outward relative to inner set of openings 56. The outer set of openings 58 are configured to receive a second set of fasteners 59 (FIG. 8) to couple second portion 16 to first portion 14 and/or engine block 13, wherein openings 58 also extend between top surface 28 and bottom surface 30. The inclusion of both inner set of openings 56 for receiving first set of fasteners 57 and outer set of openings 58 for receiving second set of fasteners 59 allows the integrity of the joint to the engine block 13 to be stronger and the clamp load to be increased. Furthermore, in various embodiments, top surface 28 may also include a set of openings 60 positioned adjacent to second end 26 configured to receive a third set of fasteners 61 to couple first portion 14 to a component of powertrain assembly 11 (see FIG. 10). In an exemplary embodiment, the set of openings 60 includes six openings extending between top surface 28 and bottom surface 30 wherein two of the openings are positioned laterally outward from the remaining openings.

In further detail and still referring to FIG. 2, top surface 28 is generally of a consistent width at first end 24 between first extended portions 48 of sides 20, 22 and at middle portion 23. In various embodiments, top surface 28 may extend outwardly as sides 20 and 22 extend outwardly toward second end 26 due to extensions 50. Additionally, in various embodiments, top surface 28 may not cover opening 52 of sides 20, 22 and therefore may include two extensions 27 at second end 26 that extend laterally outward from the side edges of top surface 28.

Figure 3:
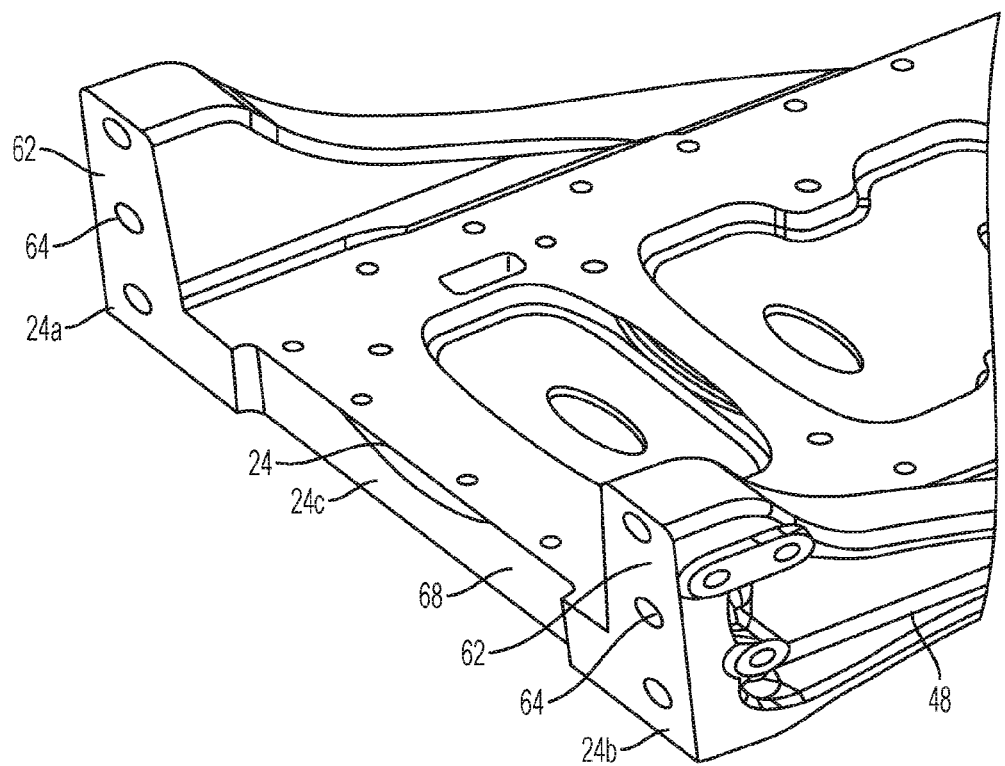
FIG. 3 shows a perspective view of a first end of the first portion of FIG. 2.

Referring to FIGS. 2 and 3, first end 24 of first portion 14 generally includes a first end 24a, a second end 24b and a middle portion 24c. First end 24a and second end 24b generally include vertically extending portions 62 extending away from first portion 14 that correspond to an end surface of first extended portion 48 of sides 20, 22. In various embodiments, first end 24a, second end 24b and/or vertically extending portions 62 include at least one opening 64 configured to receive at least one fastener 66 to couple first portion 14 to a powertrain assembly 11 (see FIG. 9). Furthermore, in an exemplary embodiment, first end 24 may have a U-shaped cross-section due to vertical extensions 62. Additionally, in various embodiments, middle portion 24c of first end 24 may include a recessed portion 68. Recessed portion 68 may extend along a substantial portion of first end 24 between vertical extensions 62.

Figure 4:
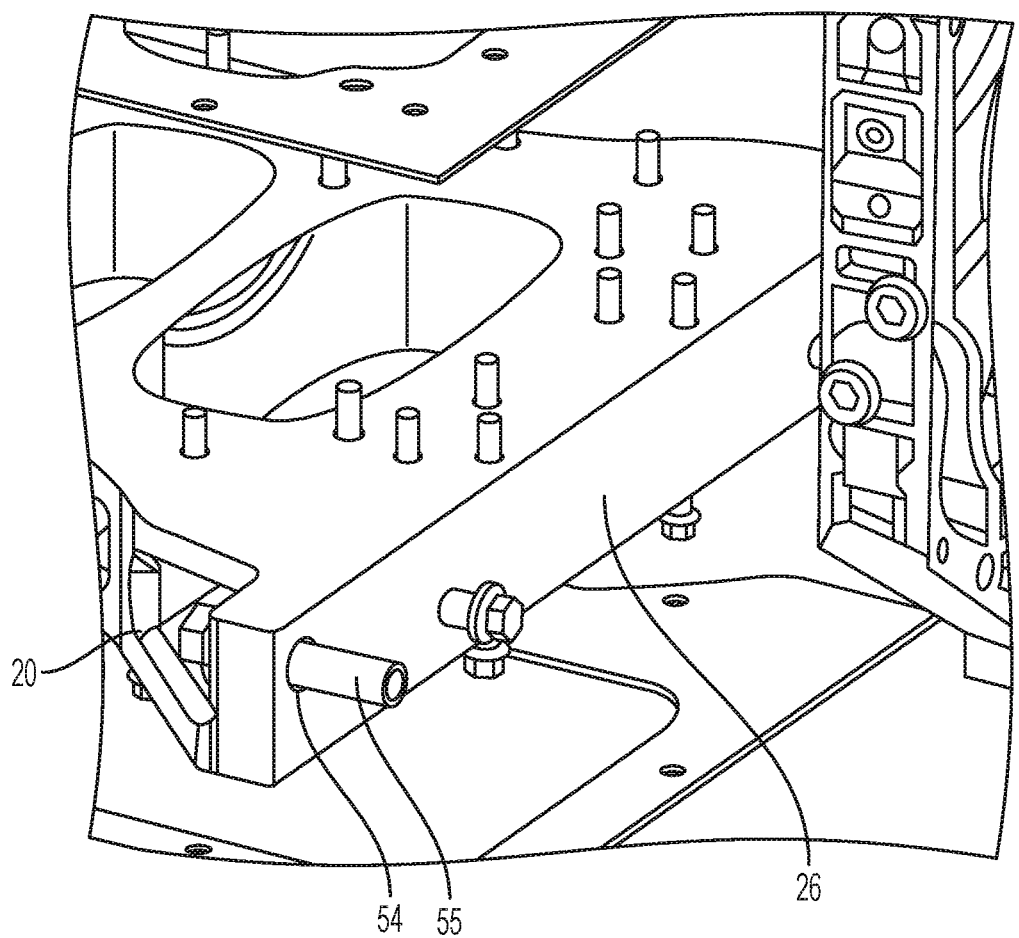
FIG. 4 shows a perspective view of a second end of the first portion of FIG. 2.

Referring to FIG. 4, second end 26 of first portion 14 generally includes a solid rectangular surface, wherein the width of the surface is substantially constant from one end to the other end. In various embodiments, second end 26 may include at least one coupling opening 54 configured to receive at least one fastener 55 to couple first portion 14 to a component of powertrain assembly 11. Opening 54 may extend through end 26 such that opening 54 is accessible from sides 20, 22 or into end 26 such that fastener 50 may be received into end 26.

Figure 5:
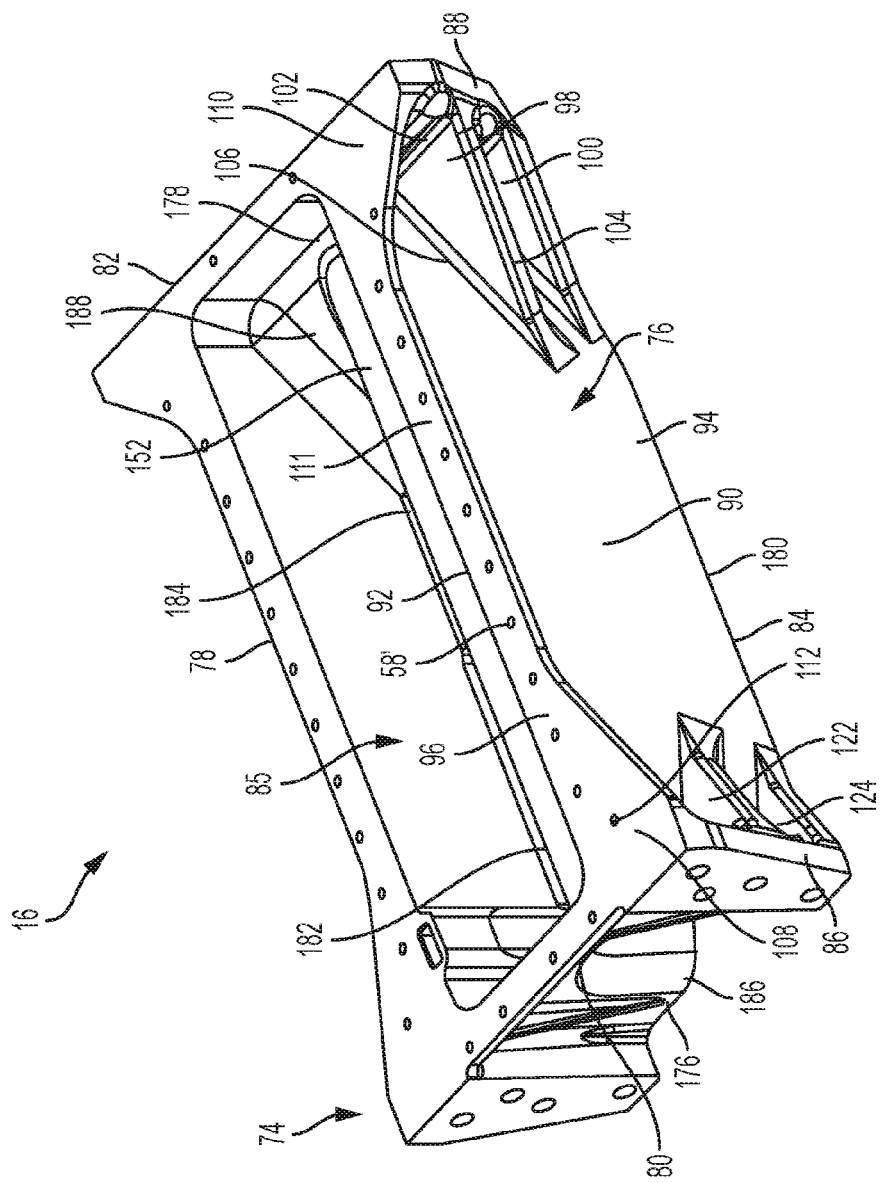
FIG. 5 shows a perspective view of a second portion of the oil pan assembly of FIG. 1.

Referring now to FIG. 5, second portion 16 of oil pan assembly 12 generally includes a body 74 having a pair of side walls 76, 78, a pair of end walls 80, 82, and a bottom wall 84. Together, walls 76, 78, 80, 82 and 84 define an interior volume 85 for containing engine lubricant (not shown).

As side walls 76 and 78 of second portion 16 are substantially the same, only side wall 76 is described in detail herein. Side wall 76 includes a first end 86 connected to end wall 80 and a second end 88 connected to end wall 82. Side wall 76 further includes an outer surface 90, an inner surface 92, a lower surface 94 and an upper surface 96. A pair of ribs 98, 100 extend from outer surface 90 adjacent end 88 and connect to end wall 82. While two ribs 98, 100 are shown, it should be understood that more or fewer ribs may be used to enhance the structural rigidity of second portion 16. In this embodiment, ribs 98, 100 are generally triangular in shape, and have one side 102 at the connection to end wall 88, another side 104 extending between end wall 88 and outer surface 90, and a hypotenuse 106 connected to outer surface 90. Ribs 98, 100 taper from side 102 to a width of zero at the intersection of side 104 and hypotenuse 106. In various embodiments, another pair of ribs 122, 124 may extend from outer surface 90 adjacent end 86 and connect to end wall 80.

In further detail and still referring to FIG. 5, upper surface 96 of side wall 76 may include an increased width rib 108 adjacent end 86 that extends away from side wall 76 and connects to end wall 80. Similarly, upper surface 96 may include an increased width rib 110 adjacent end 88 that extends away from side wall 76 and connects to end wall 82. Between increased width ribs 108, 110, upper surface 96 may further include a middle portion 111 with a substantially constant width that extends away from side wall 76 a distance less than increased width ribs 108, 110. In various embodiments, the width between middle portions 111 of side walls 76 and 78 may be less than a width of at least one of end wall 80 and/or end wall 82 due to increased width ribs 108, 110. Additionally, inner surface 92 and outer surface 90 of side wall 76 may taper in width adjacent end 88 of side wall 76 as a result of an upward slant 188 of bottom wall 84 (described below).

In further detail, and still referring to FIG. 5, a plurality of openings 58' extend through upper surface 96. Additionally, an opening 112 extends through increased width rib 108, and another opening 112 extends through increased width rib 110. Openings 58' align with the outer set of openings 58 of first portion 14 when oil pan assembly 12 is connected to engine block 13. Fasteners 59 extend through openings 58 of first portion 14 and openings 58' of second portion 16 and couple first and second portions 14 and 16 to engine block 13 of engine 10 (see FIG. 8). Openings 112 are configured to receive fasteners 116 to couple second portion 16 to first portion 14 (see FIG. 8).

Figure 6:
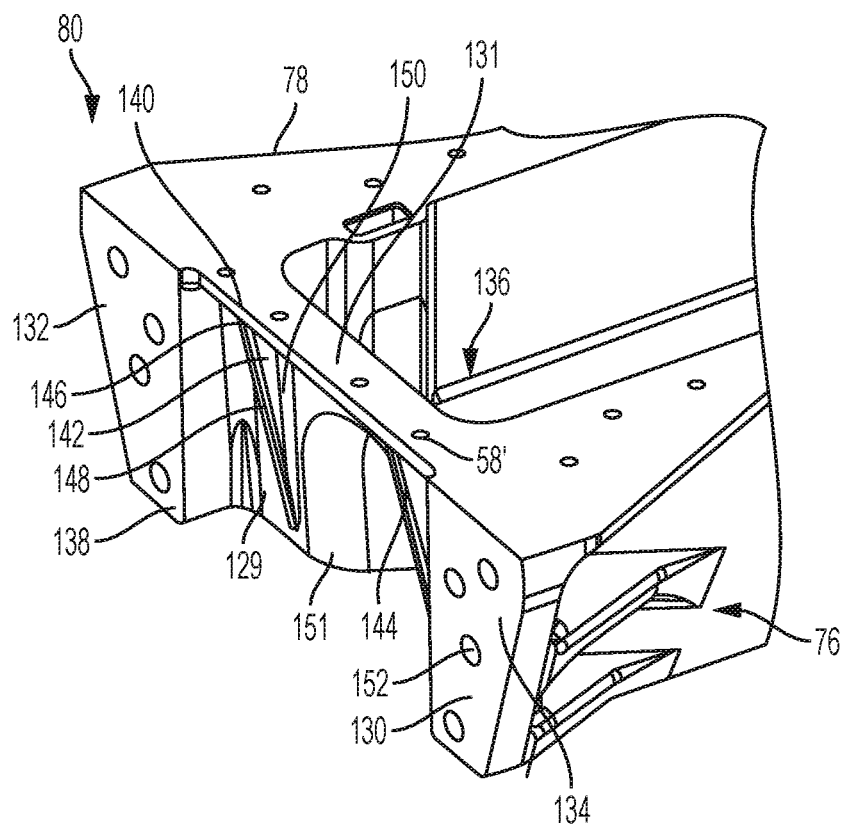
FIG. 6 shows a perspective view of a first end of the second portion of FIG. 5.

Referring now to FIG. 6, end wall 80 of second portion 16 includes a first end 130 connected to side wall 76 and a second end 132 connected to side wall 78. End wall 80 further includes an outer surface 134, an inner surface 136, a lower surface 138 and an upper surface 140. Ends 130 and 132 are tapered at their outer most edge between upper surface 140 and lower surface 138 such that lower surface 138 has a smaller width than upper surface 140. Furthermore, end wall 80 may also include an indentation 129 between first end 130 and second end 132 and upper surface 140 and lower surface 138. A pair of ribs 142, 144 may be positioned within indentation 129 and extend from upper surface 140 along outer surface 134. While two ribs 142, 144 are shown, it should be understood that more or fewer ribs may be used to enhance the structural rigidity of second portion 16. In this embodiment, ribs 142, 144 are generally triangular in shape, and have one side 146 at the connection to upper surface 140, another side 148 extending between upper surface 140 and outer surface 134, and a hypotenuse 150 connected to outer surface 134. Ribs 142, 144 taper from side 146 to a width of zero at the intersection of side 148 and hypotenuse 150. Additionally, in various embodiments, indentation 129 may further include an incurvation 151 between ribs 142, 144 as a result of a raised curvature of bottom wall 84 (described below).

Figure 11:
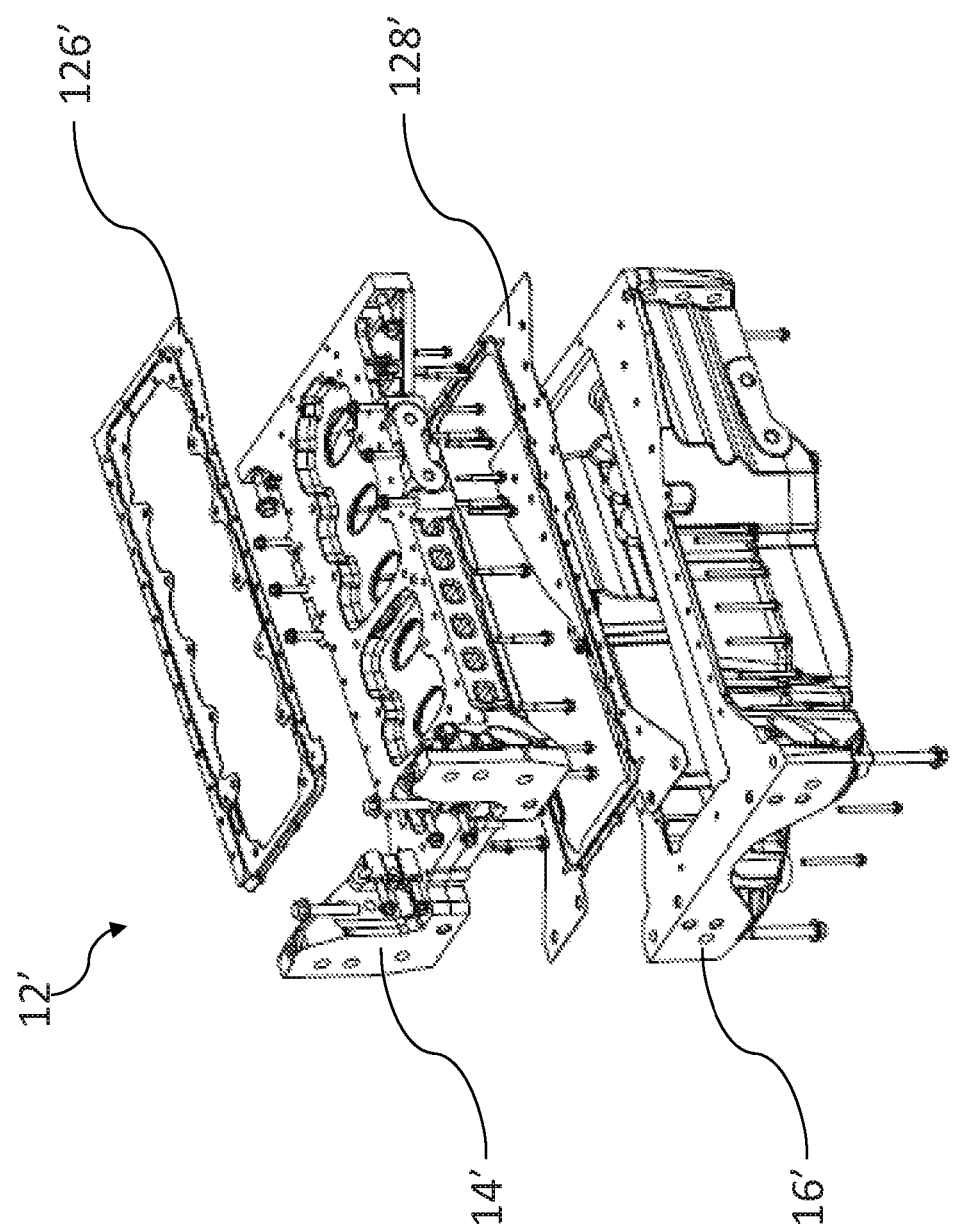
FIG. 11 shows an exploded view of another embodiment of an oil pan assembly according to the present disclosure.
Figure 12:
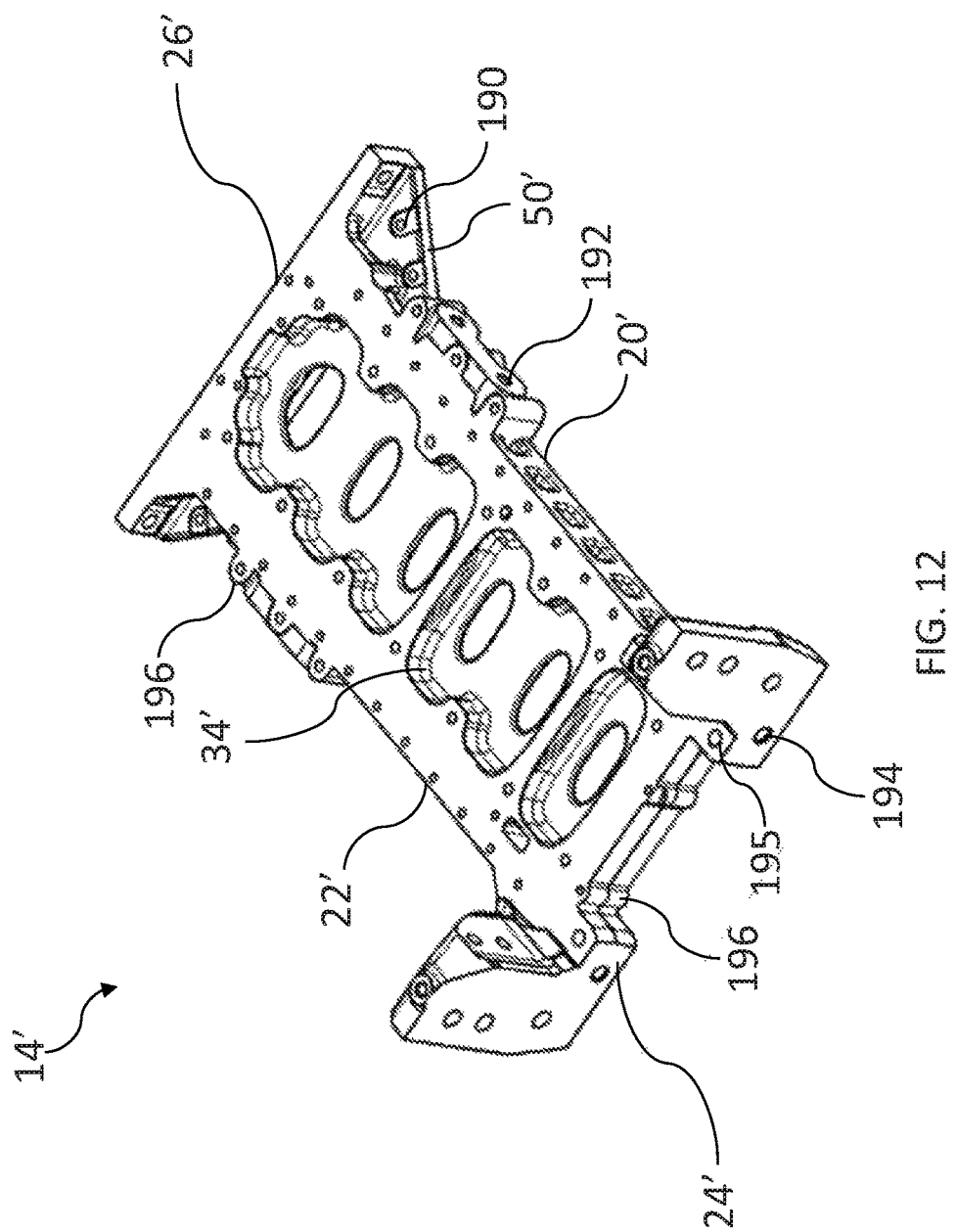
FIG. 12 shows a perspective view of a first portion of the oil pan assembly of FIG. 11.

Furthermore, and still referring to FIG. 6, first end 130 and second end 132 include at least one opening 152 configured to receive at least one fastener 154 to connect second portion 16 to a component of the powertrain assembly 11 (see FIG. 11). Fastener 154 extends through an opening of a component of powertrain assembly 11 and opening 152 of first end 130 and/or second end 132 to couple the powertrain assembly component to second portion 16. Furthermore, in various embodiments, upper surface 140 includes a middle portion 131 between first and second ends 130 and 132 that extends above indentation 129. Middle portion 131 includes at least one opening 58' extending through middle portion 131 that is configured to receive at least one fastener 59. Fastener 59 is configured to extend through opening 58 of first portion 14 and opening 58' of second portion 16 with an end portion of fastener 59 being received within an opening in engine block 13 such that first and second portions 14 and 16 are coupled to engine block 13 of engine 10 (see FIG. 8).

Figure 7:
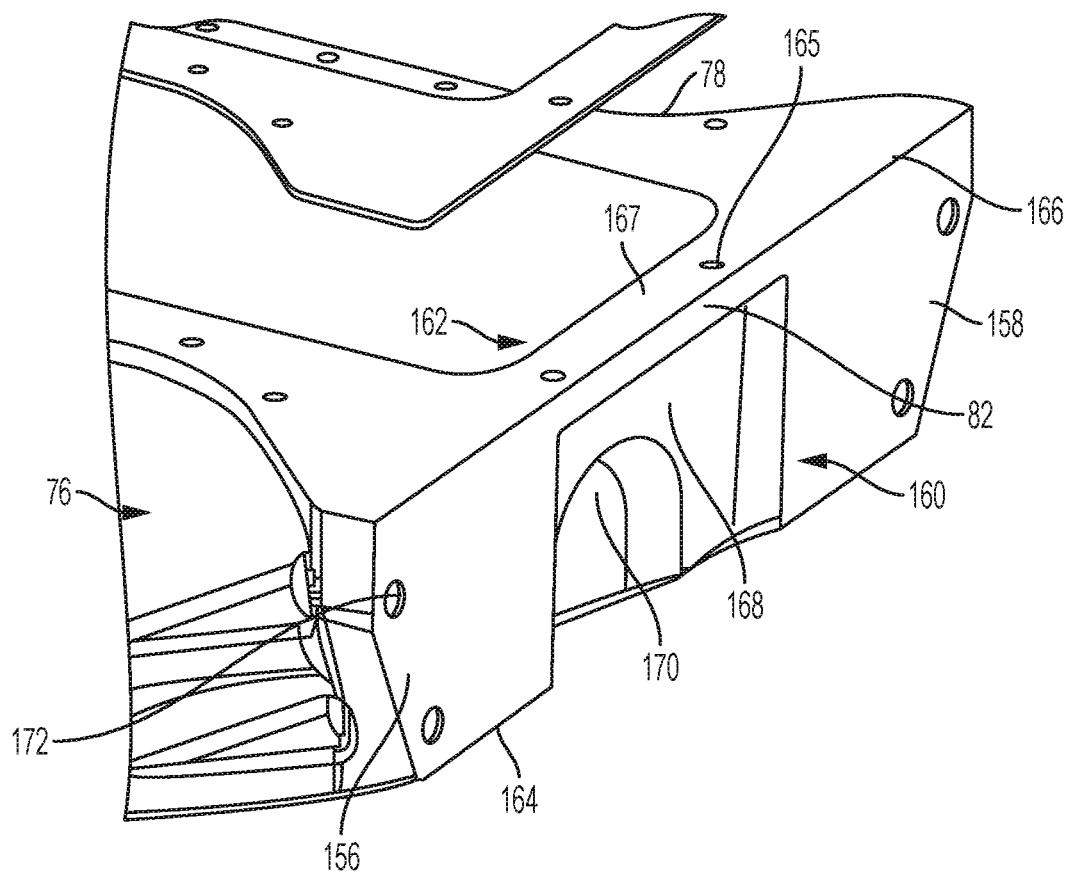
FIG. 7 shows a perspective view of a second end of the second portion of FIG. 5.

Referring now to FIG. 7, end wall 82 includes a first end 156 connected to side wall 76 and a second end 158 connected to side wall 78. End wall 82 further includes an outer surface 160, an inner surface 162, a lower surface 164 and an upper surface 166. Ends 156 and 158 are tapered at their outer most side edges between upper surface 166 and lower surface 164 such that lower surface 164 has a smaller width than upper surface 166. Furthermore, end wall 82 also includes an indentation 168 between ends 156,158 and upper surface 166 and lower surface 164. In various embodiments, indentation 168 may further include an incurvation 170 as a result of the raised curvature of bottom wall 84 (described below). In various embodiments, the height from upper surface 166 to lower surface 164 of end wall 82 may be shorter than the height of end wall 80 from upper surface 140 to lower surface 138 due to the upward slant 188 of bottom wall 84 (described below).

Figure 10:
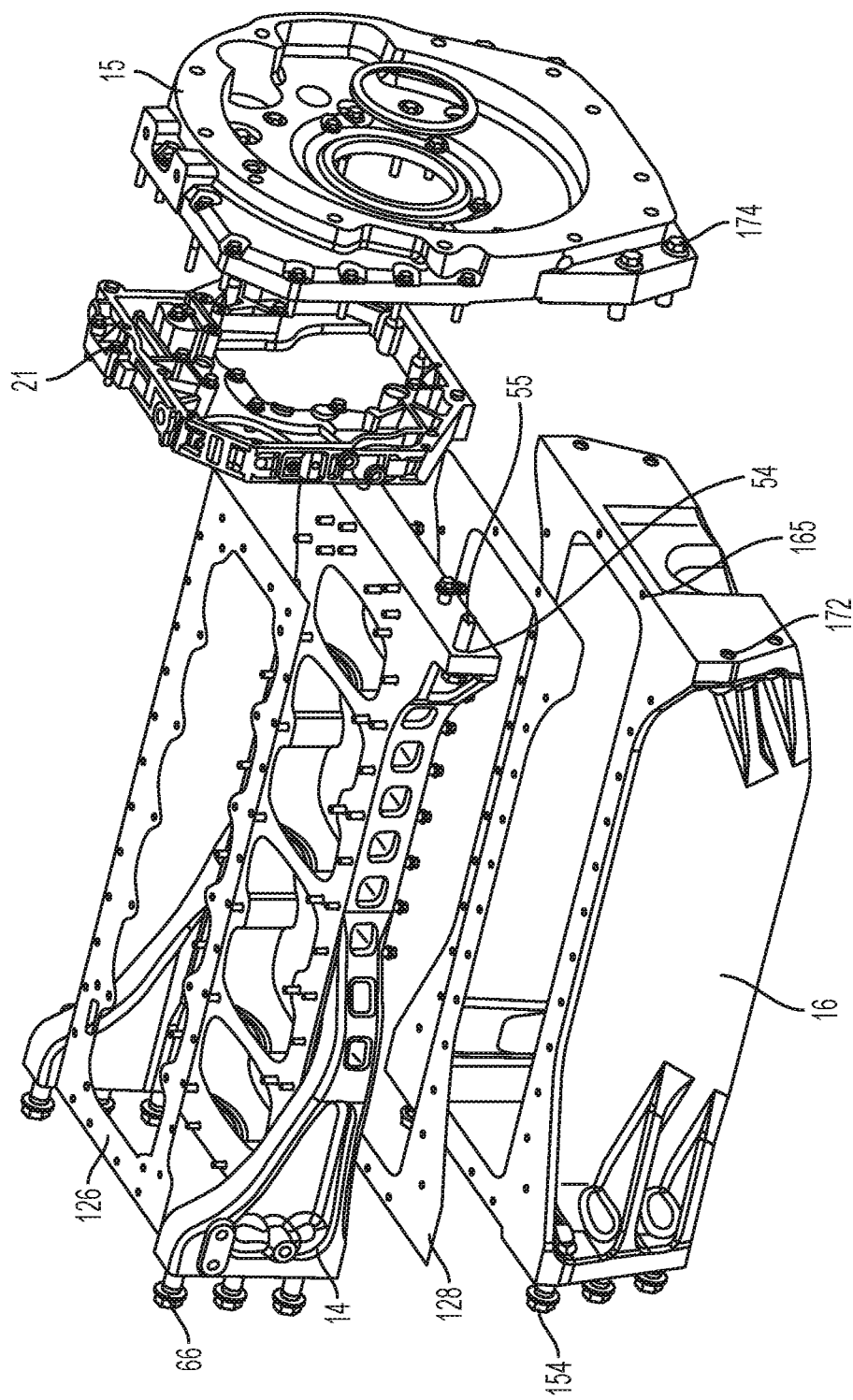
FIG. 10 shows an exploded view of the rear gear housing, the flywheel housing, and a first portion, a second portion, gaskets and brackets of the oil pan assembly of FIG. 9.

Furthermore, and referring to FIGS. 7 and 10, first and second ends 156, 158 include at least one opening 172 configured to receive at least one fastener 174 to connect second portion 16 to a component of powertrain assembly 11. Fastener 174 extends through an opening of the component of powertrain assembly 11 and opening 172 to couple the component to second portion 16. In an exemplary embodiment, fastener 174 may be a nut and bolt, wherein the bolt extends through opening 172 and the opening in the component of the powertrain assembly 11 and the nut is attached to the bolt once passed through said openings.

In further detail, upper surface 166 includes a middle portion 167 between ends 156 and 158 that extends outwardly above indentation 168. Middle portion 167 includes at least one opening 165 configured to receive at least one fastener 163. Fasteners 163 extends through opening 60 of first portion 14 and opening 165 of second portion 16 to couple first and second portions 14 and 16 to a component of powertrain assembly 11. In various embodiments, at least one opening 165 of middle portion 167 may be configured to receive a fastener 59 to couple second portion 16 to opening 58' of first portion 14 and engine block 13 of engine 10.

Referring back to FIG. 5, bottom wall 84 includes a first end 176 connected to end wall 80, a second end 178 connected to end wall 82, a first side 180 connected to side wall 76 and a second side 182 connected to side wall 78. Bottom wall 84 further includes an inner surface 184 and an outer surface 186. Inner surface 184 of bottom wall 84 includes a raised curvature 152 that creates incurvations 151 and 170 in ends 80 and 82 (see FIGS. 6 and 7) that extends into interior volume 85 and from first end 176 to second end 178. Furthermore, bottom wall 84 may further include an upward slant 188 adjacent to second end 178 and connected to end wall 82. In various embodiments, bottom wall 84 may include both raised curvature 152 and upward slant 188, wherein raised curvature extends through upward slant 188.

Figure 9:
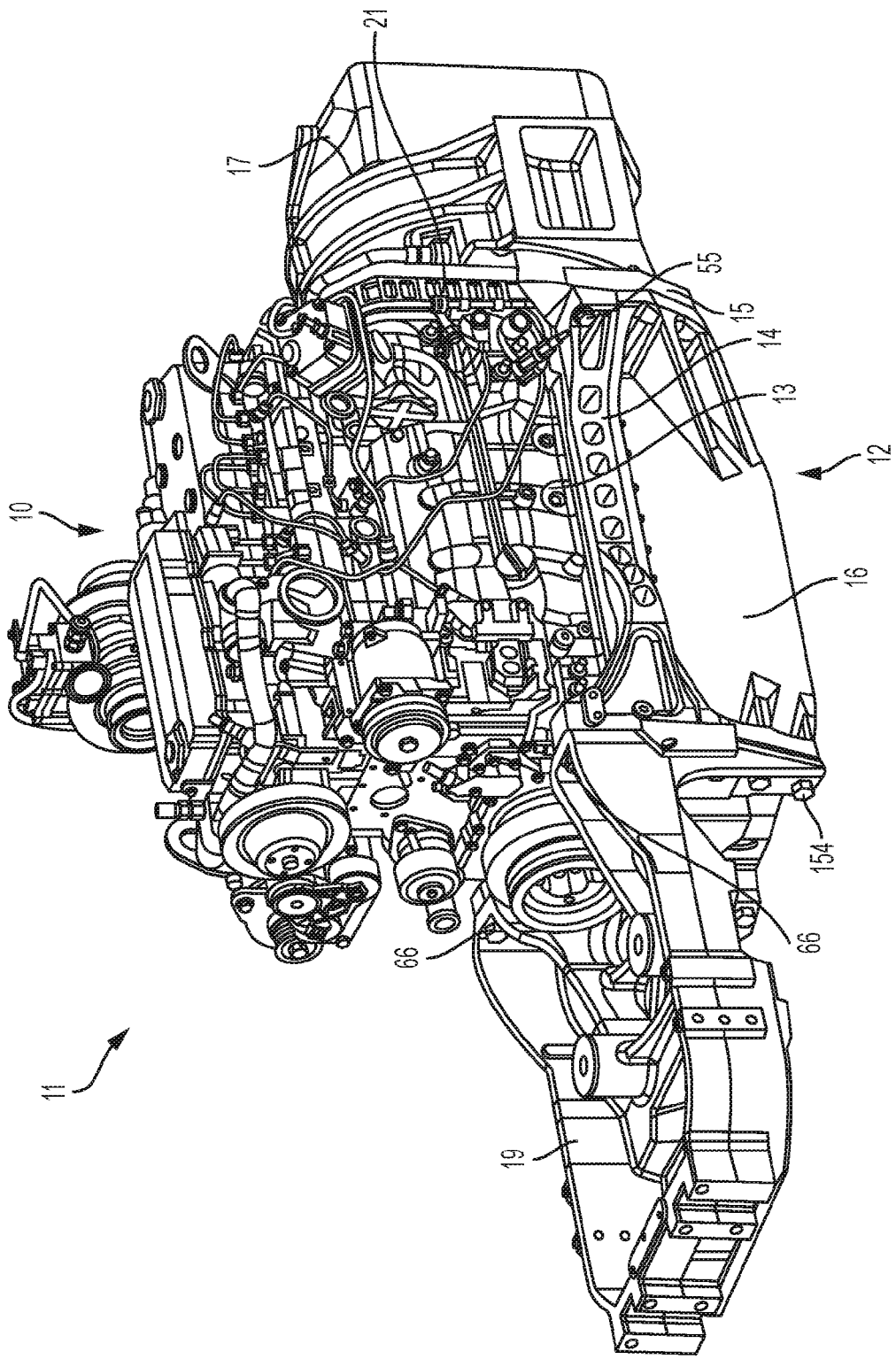
FIG. 9 shows a perspective view of a powertrain assembly comprising an engine having an engine block, a flywheel housing, a rear gear housing, a transmission, an axle carrier and an embodiment of an oil pan assembly of the present disclosure.

Referring to FIG. 9, in various embodiments, engine 10 may be part of a powertrain assembly 11, wherein the powertrain assembly 11 includes a plurality of components. In an exemplary embodiment, the plurality of components includes at least engine 10 including engine block 13, a flywheel housing 15 and/or a transmission 17, and an axle carrier 19. In various embodiments, flywheel housing 15 and/or transmission 17 may be positioned rearward of engine 10, while axle carrier 19 may be positioned forward of engine 10. Furthermore, in various embodiments, the powertrain assembly 11 may also include a rear gear housing 21. Generally, rear gear housing 21 is positioned rearward of engine 10 and between engine 10 and flywheel housing 15. In various embodiments, oil pan assembly 12 may be coupled to engine block 13, flywheel housing 15, transmission 17, axle carrier 19 and/or rear gear housing 21. In an exemplary embodiment, first portion 14 of oil pan assembly 12 is positioned between engine block 13 and second portion 16 and is coupled to engine block 13, flywheel housing 15, axle carrier 19 and rear gear housing 21, while second portion 16 of oil pan assembly 12 is coupled to engine block 13, flywheel housing 15, rear gear housing 21 and axle carrier 19.

Figure 8:
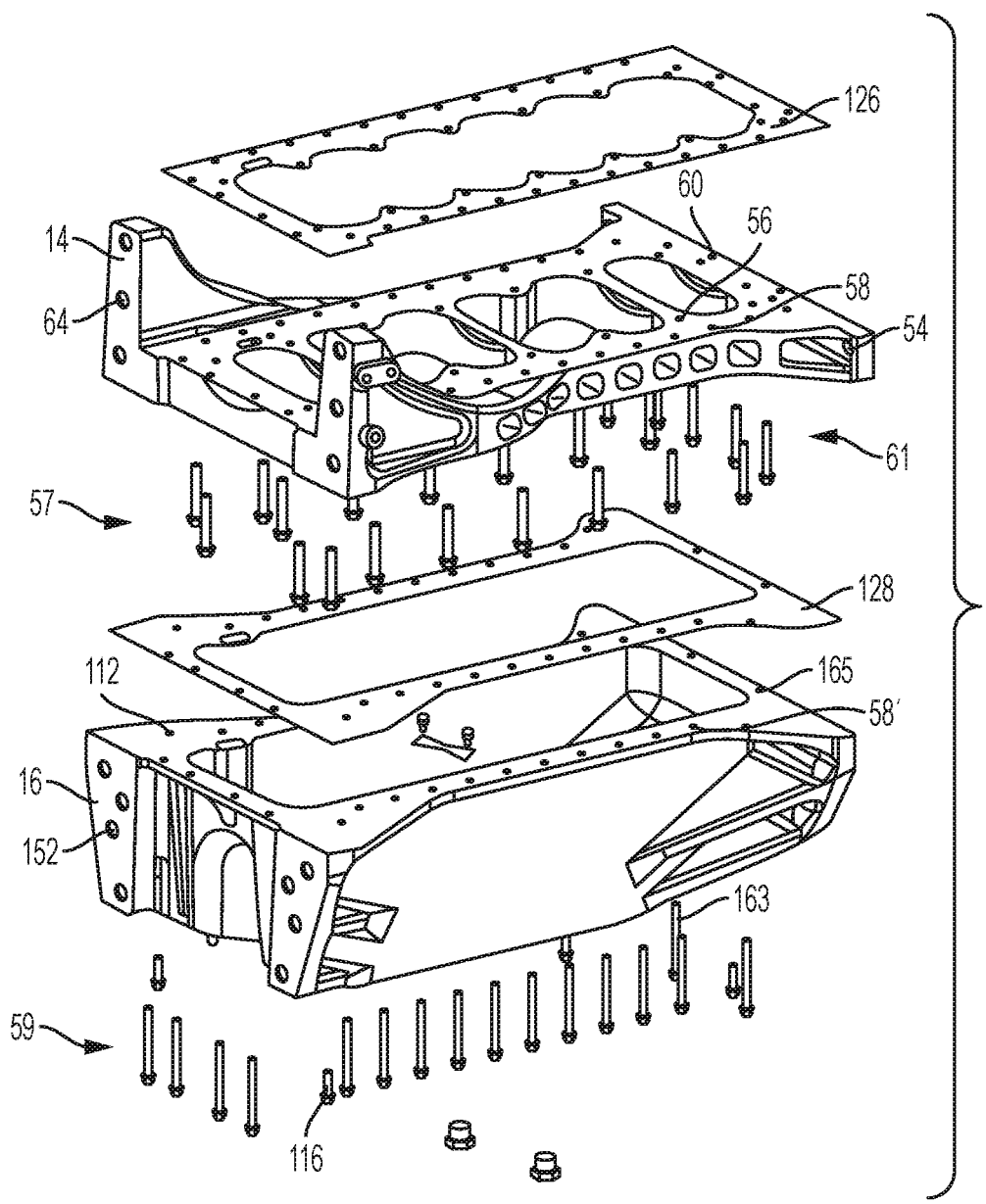
FIG. 8 shows an exploded view of the first portion, the second portion, fasteners and gaskets of the oil pan assembly of FIG. 1.

Referring now to FIGS. 8-10, as described above, first portion 14 includes a plurality of openings 56, 58, 54, 60, and 64 for coupling first portion 14 to components of powertrain assembly 11. Each set of openings 56, 58, 54, 60, and 64 are configured to couple first portion 14 to at least one of engine block 13, flywheel housing 15, transmission 17, axle carrier 19 and rear gear housing 21. First portion 14 includes a first set of openings 56 configured to receive fasteners 57. Fasteners 57 are configured to extend through openings 56 and into openings within engine block 13 of engine 10 to couple first portion 14 to engine block 13. First portion 14 further includes a second set of openings 58 configured to receive fasteners 59. Fasteners 59 are configured to extend through an opening in second portion 16 and opening 58 and to be received into an opening in engine block 13 to couple first and second portions 14, 16 to engine block 13. In various embodiments, a first gasket 126 may be positioned between engine block 13 and first portion 14 and a second gasket 128 may be positioned between first portion 14 and second portion 16 when first and second portions 14, 16 are coupled to engine block 13 to help contain the engine lubricant within oil pan assembly 12 (not shown). Furthermore, in various embodiments, the sealing elements of oil pan assembly 12 may include a groove feature to improve the sealing ability of the elements. The sealing elements of oil pan assembly 12 may include first and second gaskets 126, 128.

Additionally, first portion 14 includes a third set of openings 54 configured to receive fasteners 55. Fasteners 55 are configured to extend through openings 54 and an opening in flywheel housing 15 or transmission 17 to couple first portion 14 to flywheel housing 15 or transmission 17. In an exemplary embodiment, fastener 55 is a nut and bolt, and the bolt extends through opening 54 and the opening in flywheel housing 15 or transmission 17 and is received by the nut on the opposite side. Furthermore, first portion 14 may include a set of openings 60 extending from a bottom surface of first portion 14 to a top surface of first portion 14 configured to receive a set of fasteners 61 to couple rear gear housing 21 to first portion 14. Fastener 61 is configured to extend through opening 60 in first portion 14 and into an opening within rear gear housing 21 such that first portion 14 and rear gear housing 21 are coupled together. In an exemplary embodiment, fastener 61 is a bolt that extends through opening 60 in first portion 14 and is screwed into an opening in rear gear housing 21. First portion 14 also includes a fifth set of openings 64 configured to receive fasteners 66. Fasteners 66 are configured to extend through an opening in axle carrier 19 and into opening 64 of first portion 14 such that axle carrier 19 and first portion 14 are coupled together. In an exemplary embodiment, fastener 66 is screwed into opening 64 of first portion 14. Additionally, second portion 16 may include at least one opening 58' configured to receiver fastener 61 to couple second portion 16 to first portion 14 and rear gear housing 21. Having first portion 14 coupled to components of the powertrain allows loads placed on the tractor to be successfully transmitted through oil pan assembly 12.

Referring still to FIGS. 8-10, second portion 16 includes a plurality of openings, 58', 112, 152, and 172 for coupling to components of powertrain assembly 11. Each set of openings 58', 112, 152, 172 and 165 are configured to couple second portion 16 to first portion 14, engine block 13, flywheel housing 15, transmission 17, axle carrier 19 and/or rear gear housing 21. Second portion 16 includes a first set of openings 58' for coupling to first portion 14 and engine block 13. Openings 58' are configured to receive fasteners 59. Each fastener 59 is configured to extend through an opening 58' in second portion 16, an opening 58 in first portion 14, and to be received into an opening in engine block 13. In an exemplary embodiment, fastener 59 is screwed into the opening in engine block 13. Additionally, second portion 16 includes a second set of openings 112 for coupling to first portion 14. Openings 112 are configured to receive fasteners 116. Fastener 116 is configured to extend through opening 112 of second portion 16 and be received into an opening in first portion 14. Furthermore, second portion 16 includes a third set of openings 152 for coupling second portion 16 to axle carrier 19. Opening 152 is configured to receive fastener 154. Fastener 154 is configured to extend through an opening in axle carrier 19 and be received into opening 152 of second portion 16. Second portion 16 also includes a fourth set of openings 172 for coupling to flywheel housing 15 or transmission 17. Openings 172 are configured to receive fasteners 174. Fasteners 174 are configured to extend through openings in flywheel housing 15 or transmission 17 and be received into openings 172 of second portion 16. Furthermore, second portion 16 includes a fifth set of openings 165 configured to receive fasteners 163 for coupling second portion 16 to rear gear housing 21 or engine block 13. In various embodiments, fasteners 163 are configured to extend through openings 165 in second portion 16 and openings 60 in first portion 14 and be received into openings in rear gear housing 21. In other various embodiments, fasteners 163 are configured to extend through openings 165 and openings 60 and be received into openings in engine block 13.

Figure 13:
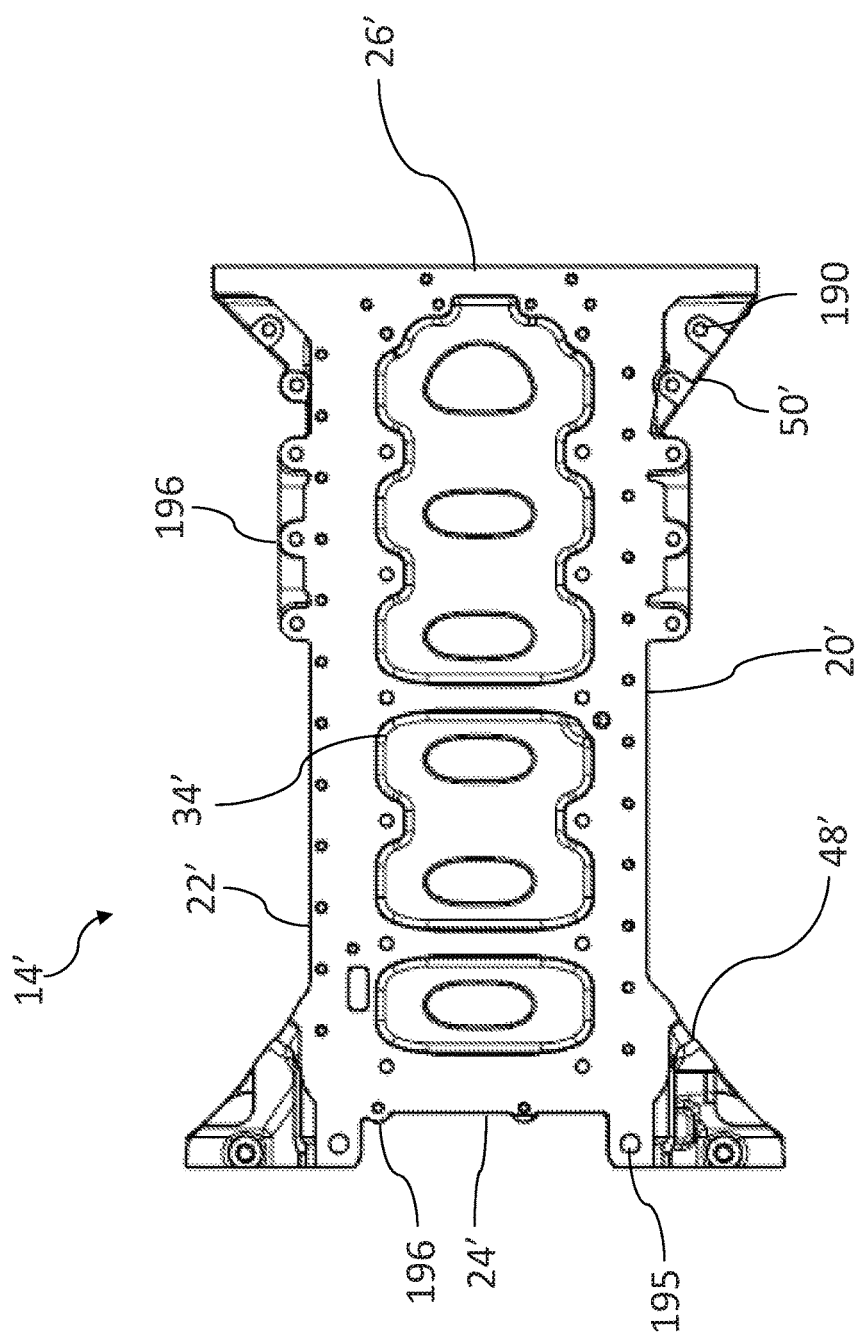
FIG. 13 shows a top view of the first portion of FIG. 12.
Figure 14:
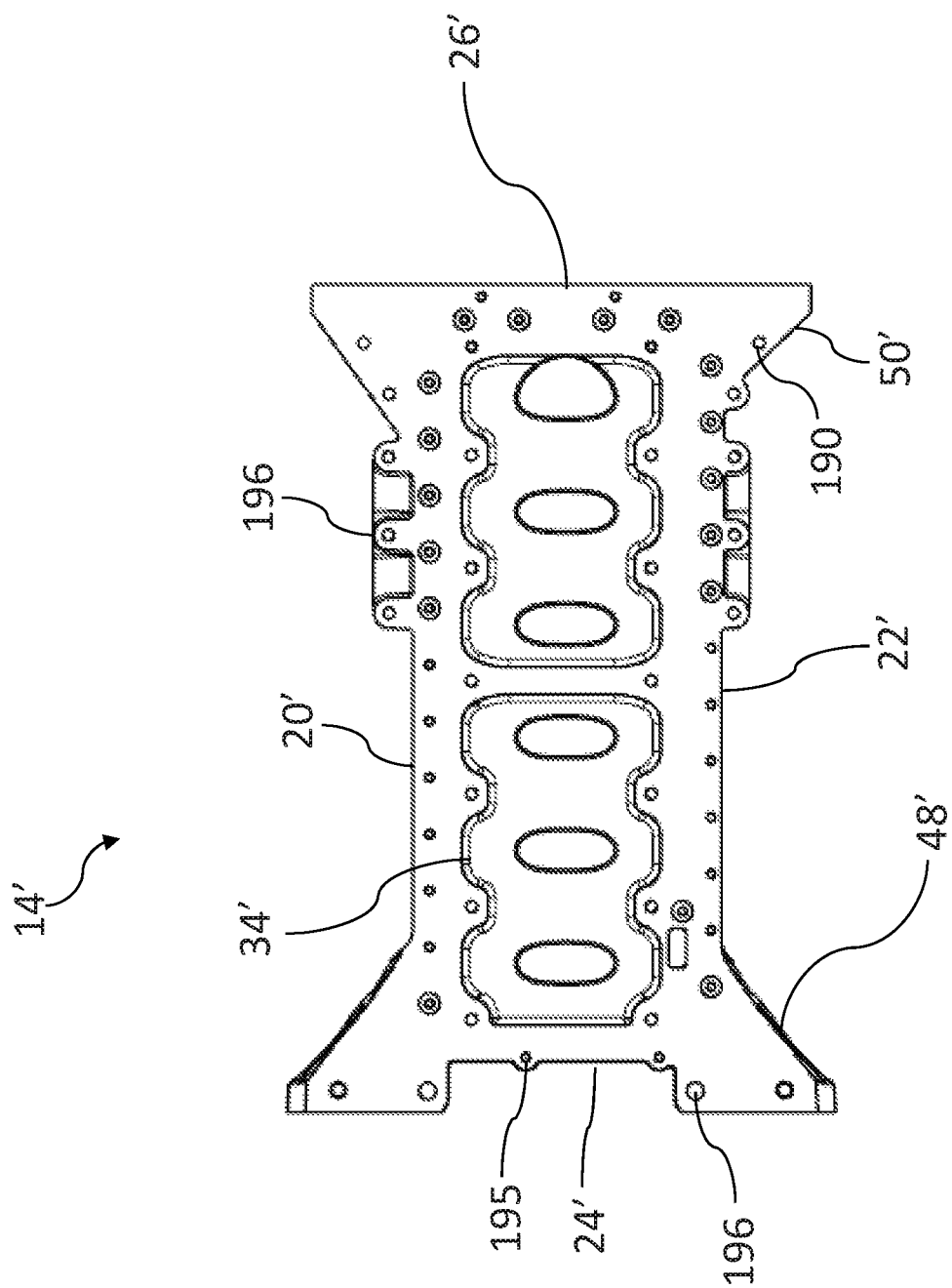
FIG. 14 shows a bottom view of the first portion of FIG. 12.
Figure 15:
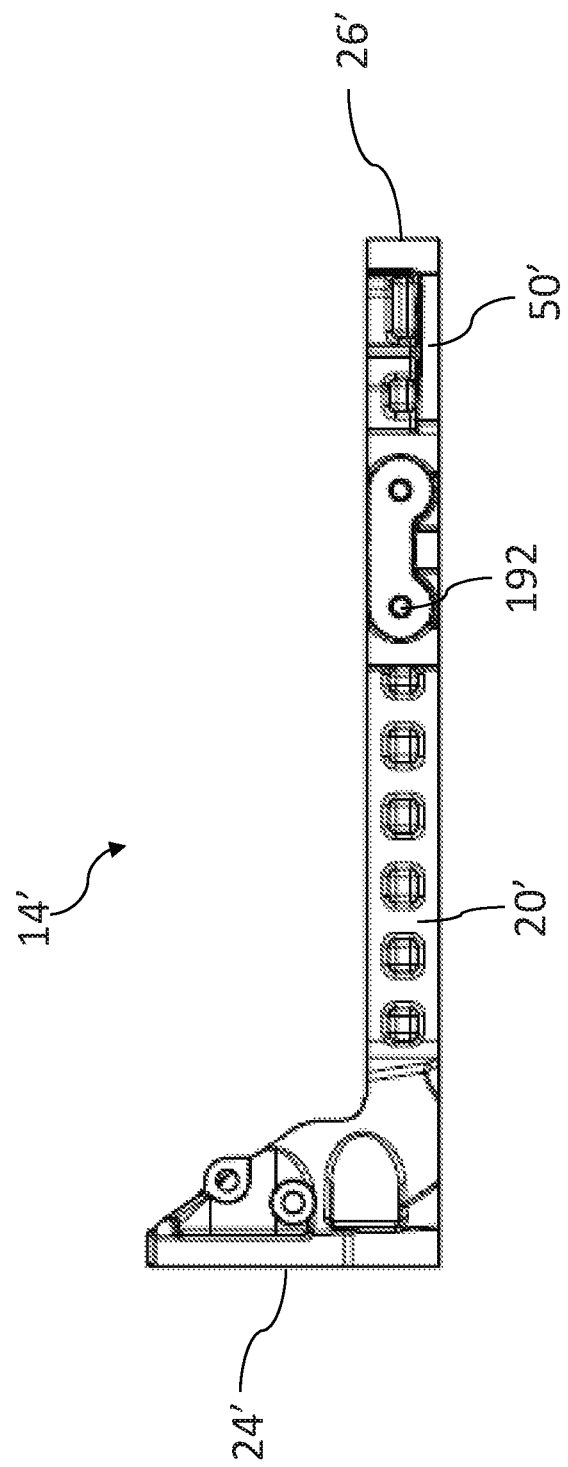
FIG. 15 shows a side view of the first portion of FIG. 12.
Figure 16:
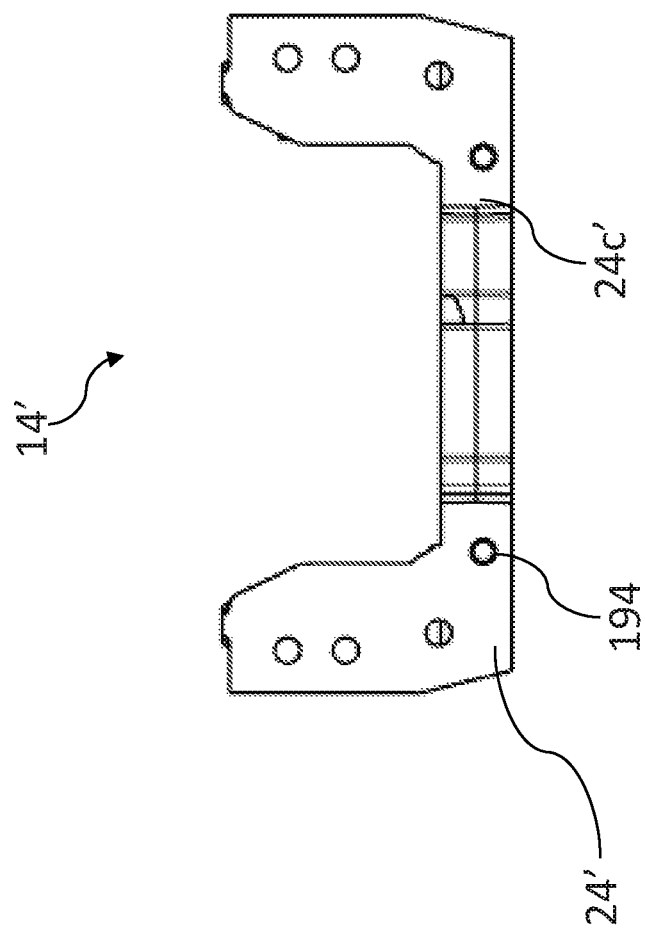
FIG. 16 shows a front end view of the first portion of FIG. 12.
Figure 17:
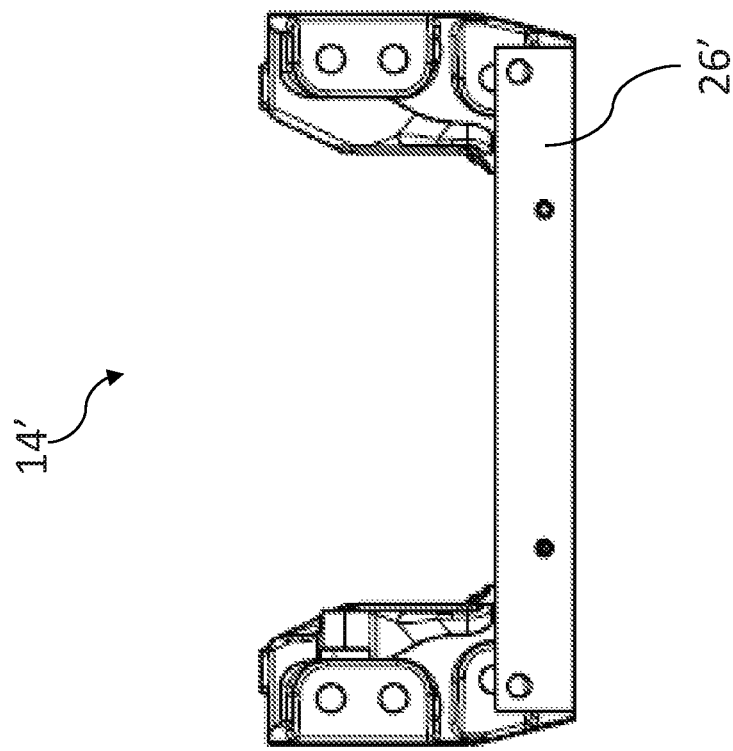
FIG. 17 shows a rear end view of the first portion of FIG. 12.

Referring to FIGS. 11-29, an additional embodiment of oil pan assembly 12' is provided. As shown in FIGS. 12-17, first portion 14' of oil pan assembly 12' may further include one or more coupling openings 190 in second extended portion 50', one or more coupling openings 192 along sides 20', 22', one or more coupling openings 194 along middle portion 24c' of first end 24', one or more protrusions 196 along sides 20, 22 and/or first end 24', and/or a plurality of different sized and/or shaped openings 34' within a middle portion of first portion 14'. Additionally, first extended portions 48' of first portion 14' may extend outward for a shorter distance. For instance, as shown in FIG. 13, extended portions 48' extend out from approximately ¼ of the way along the length of first portion 14'.

Figure 19:
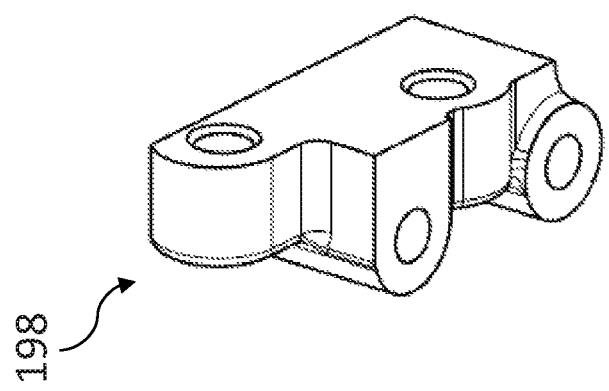
FIG. 19 shows a perspective view of a right-side bracket configured to couple the first portion to the engine block.
Figure 18:
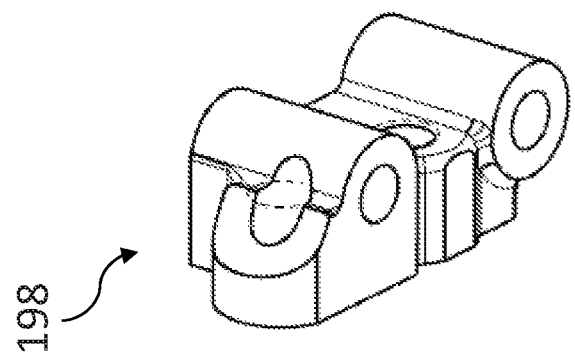
FIG. 18 shows a perspective view of a left-side bracket configured to couple the first portion to the engine block.

Furthermore, with reference to FIGS. 18 and 19, brackets 198 may be provided to couple first portion 14' to engine block 13. More specifically, brackets 198 may be provided to couple first portion 14' to a front portion of engine block 13.

Figure 20:
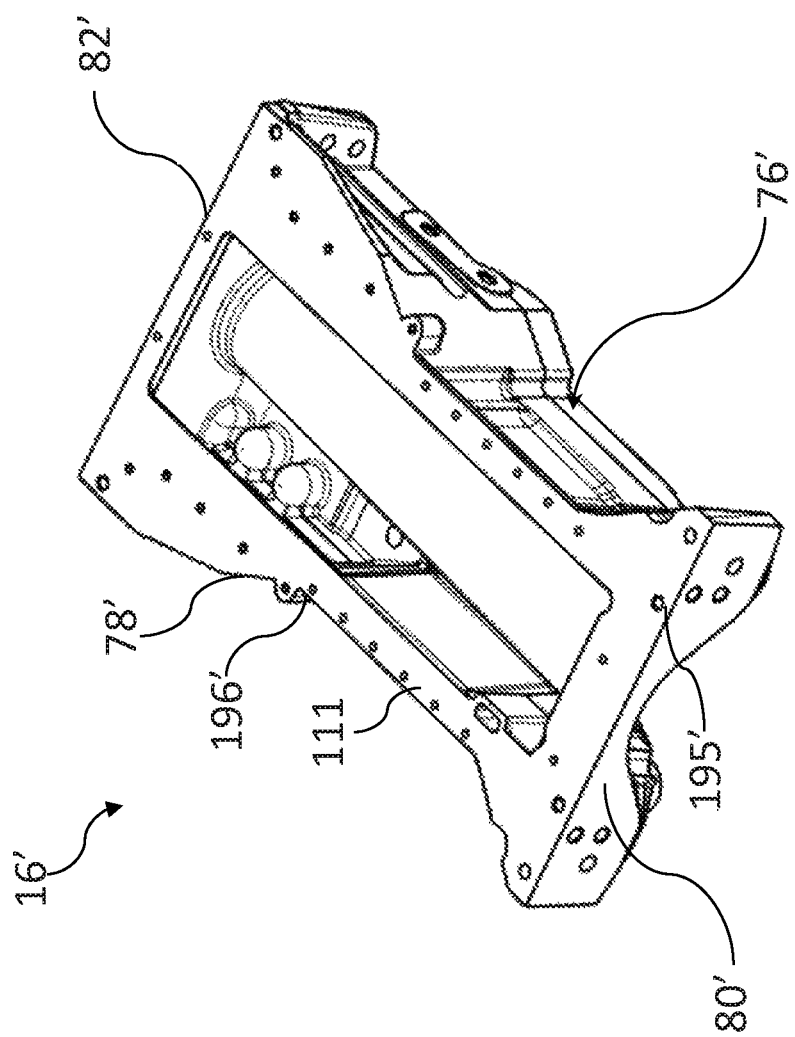
FIG. 20 shows a perspective view of a second portion of the oil pan assembly of FIG. 11.
Figure 21:
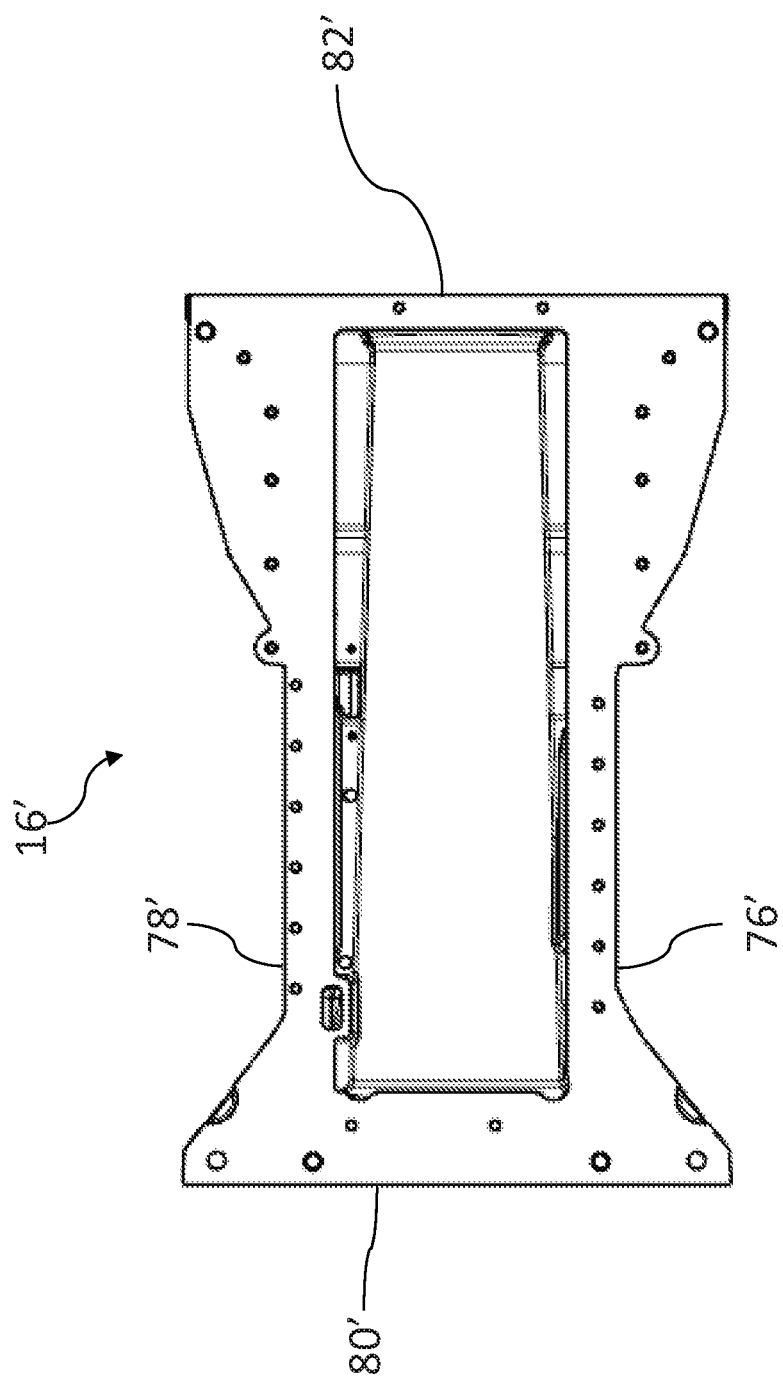
FIG. 21 shows a top view of the second portion of FIG. 20.
Figure 22:
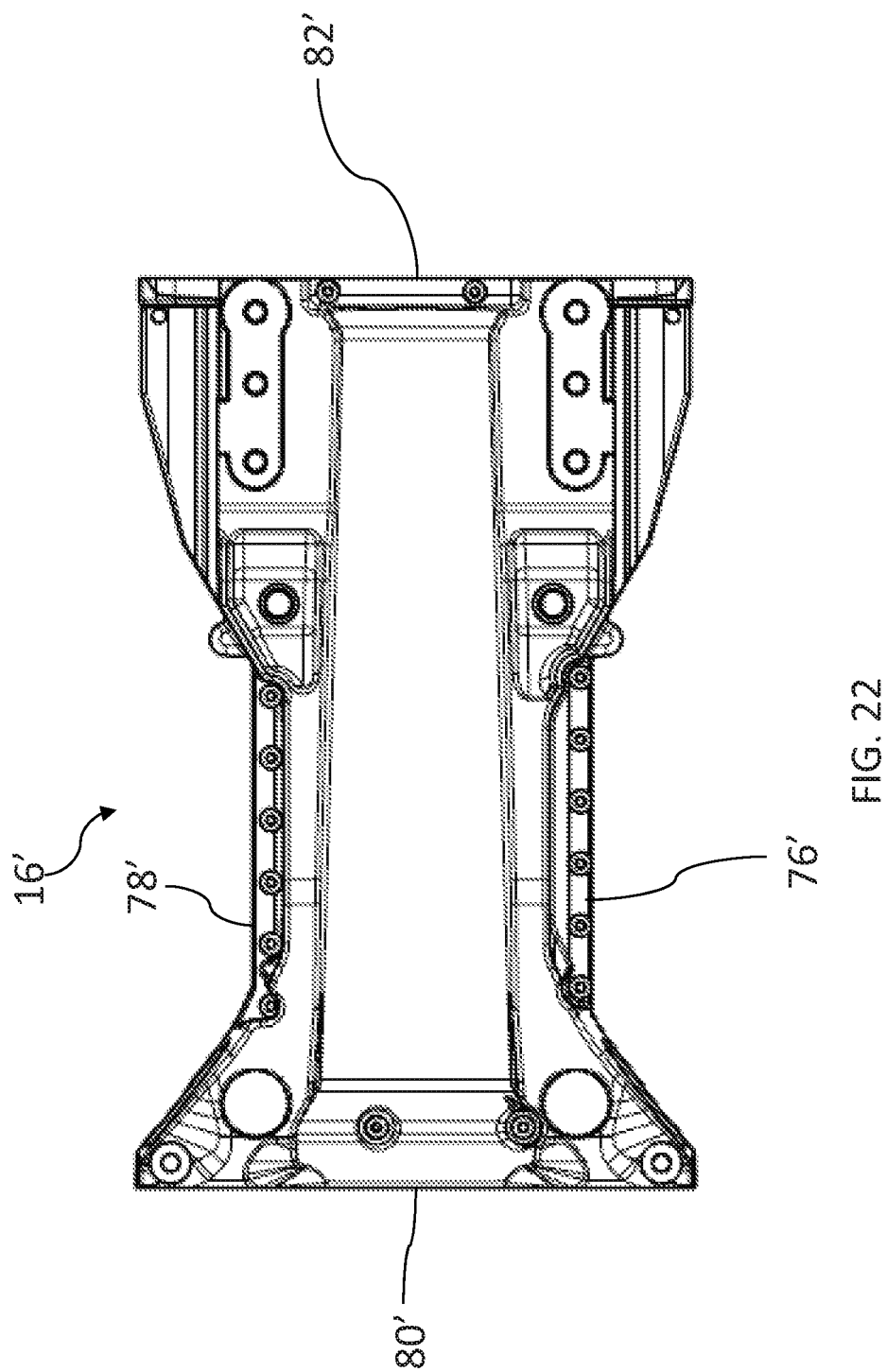
FIG. 22 shows a bottom view of the first portion of FIG. 20.
Figure 23:
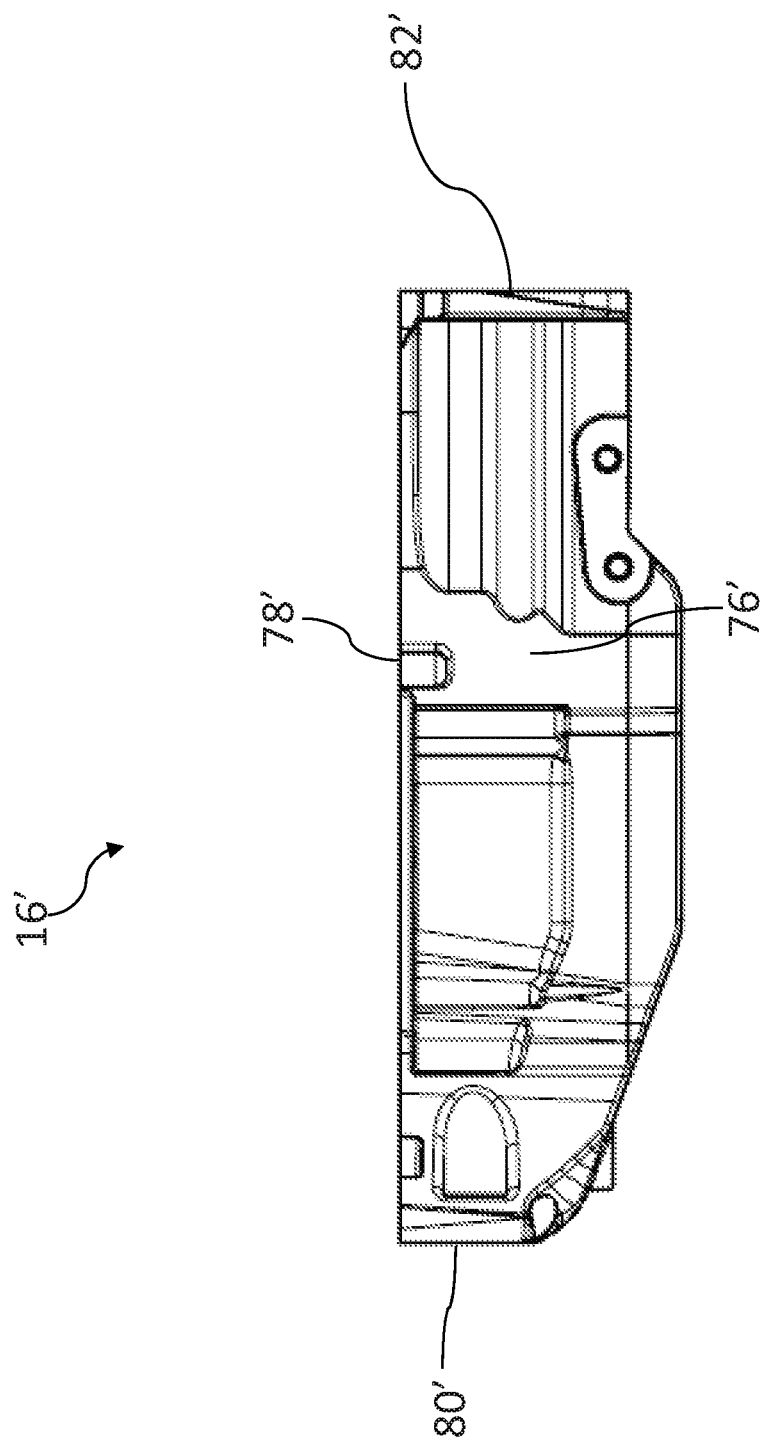
FIG. 23 shows a side view of the first portion of FIG. 20.
Figure 24:
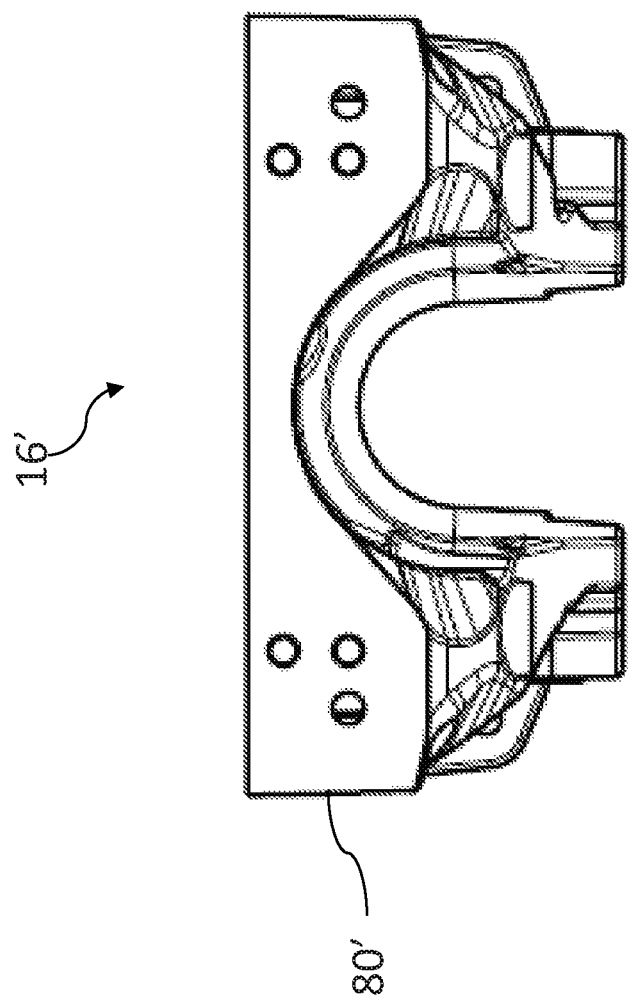
FIG. 24 shows a front end view of the first portion of FIG. 20.
Figure 25:
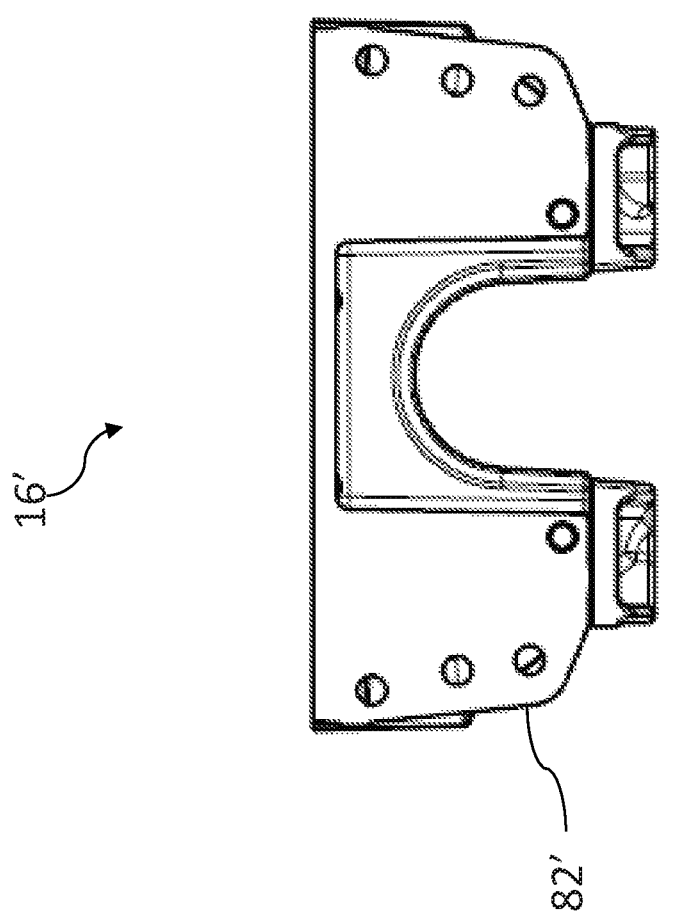
FIG. 25 shows a rear end view of the first portion of FIG. 20.
Figure 26:
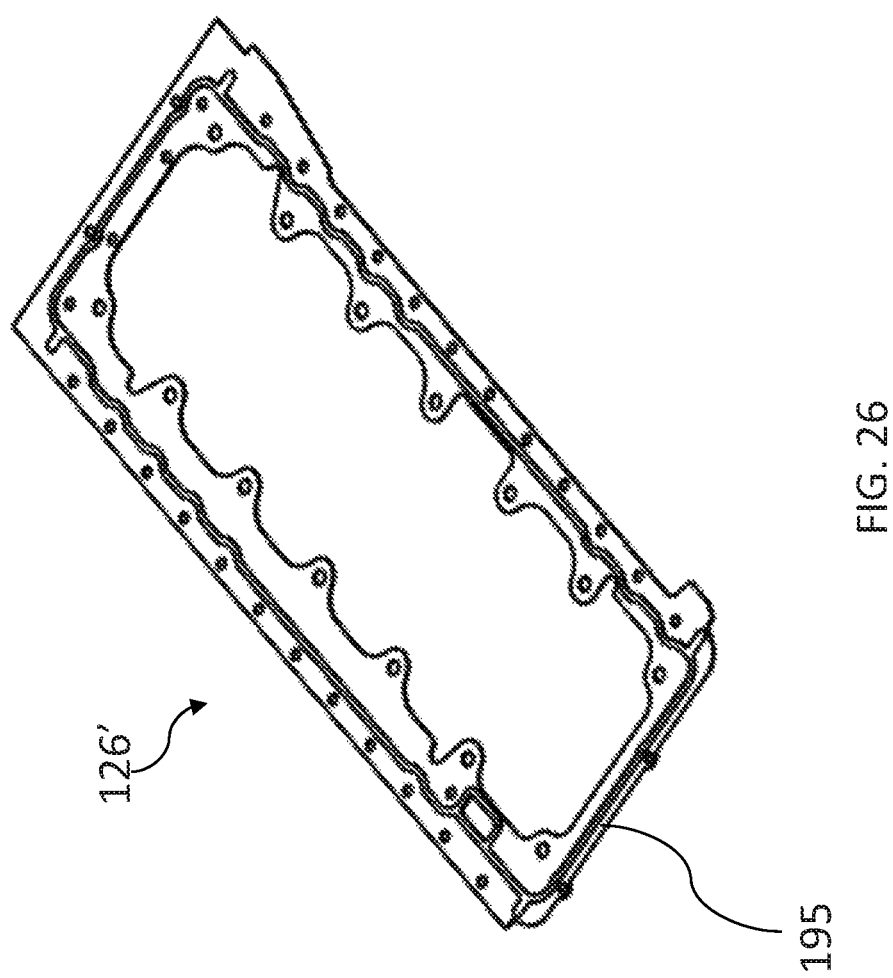
FIG. 26 shows a perspective view of a first gasket of the oil pan assembly of FIG. 11.
Figure 27:
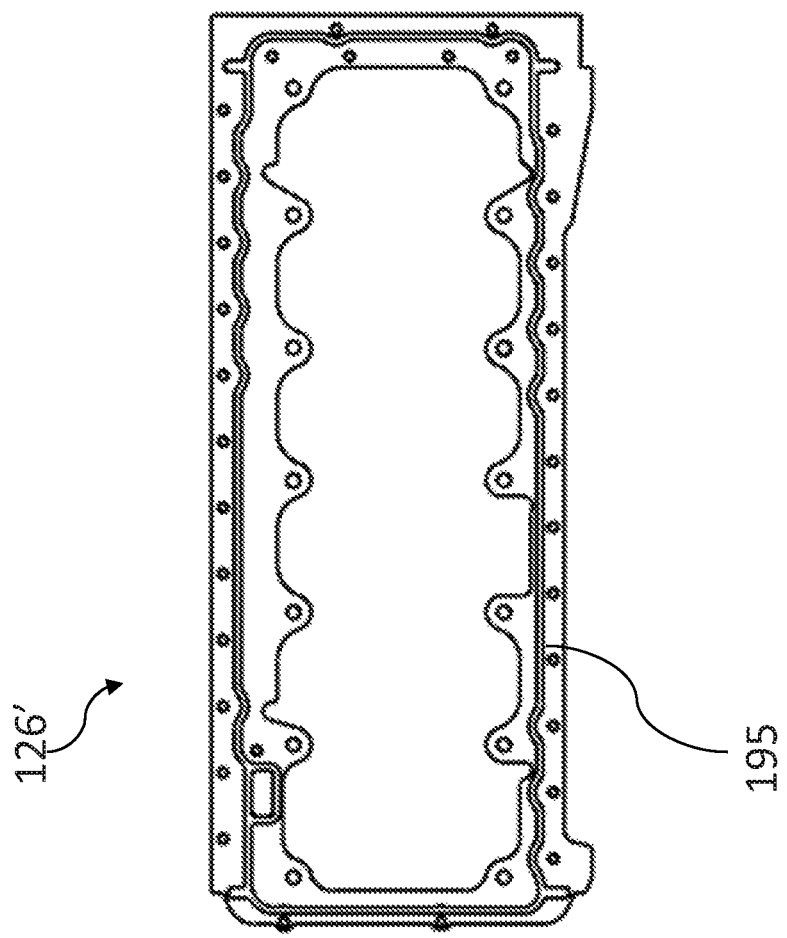
FIG. 27 shows a top view of the first gasket of FIG. 26.
Figure 28:
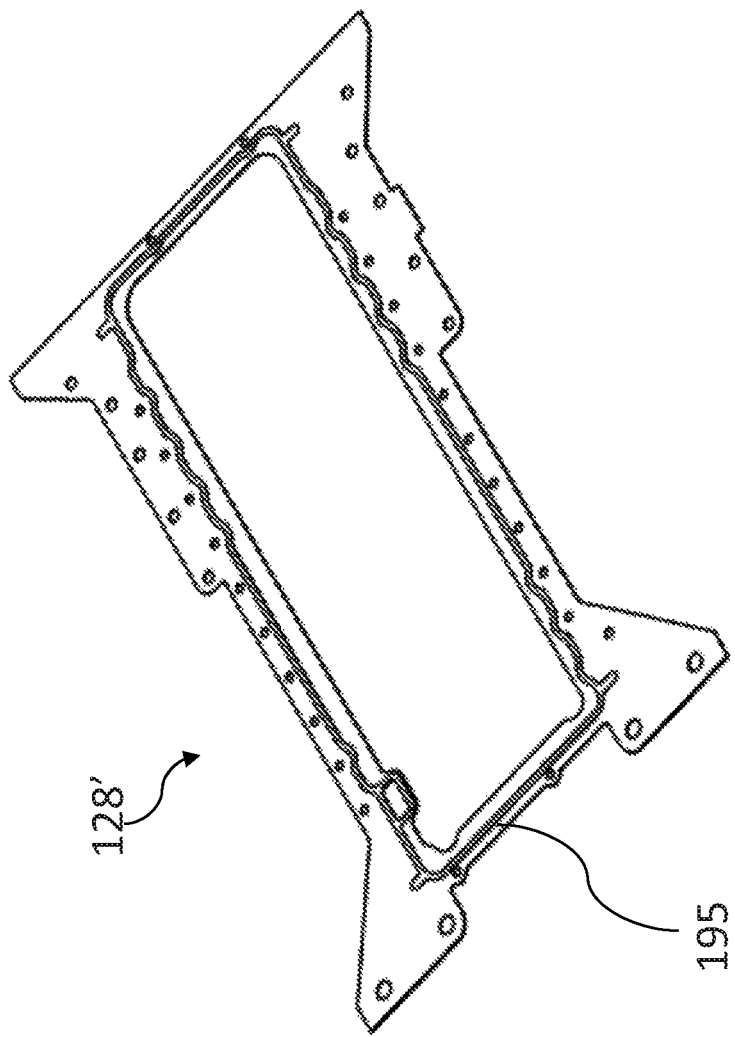
FIG. 28 shows a perspective view of a second gasket of the oil pan assembly of FIG. 11.

Referring now to FIGS. 20-25, second portion 16' may also include one or more protrusions 196' along middle portions 111' of side walls 76' and 78'. Furthermore, second portion 16' may include side walls 76' and 78' extended outward in place of ribs 98, 100, and 122 to maximize the torsional stiffness of the pan along end walls 80' and 82'. Additionally, as shown in FIG. 20, side walls 76' and 78' may extend outward a longer distance of upper surface 96 than side walls 76 and 78 of second portion 16. For instance, side walls 76' and 78' may extend out starting between approximately ¼ to approximately ½ of the way along the length of second portion 16'. End wall 80' may also be shorter in height.

Moreover, as shown in FIGS. 12, 13, 20, and 1, first portion 14' and second portion 16' may include additional coupling openings 195 along first end 24' and end wall 80' for further coupling portions 14' and 16' together in order to reduce joint sliding between the portions.

Furthermore, and with reference to FIGS. 26-29, gaskets 124, 126 of oil pan assembly 12 may be formed of a single material or multiple materials. For example, gaskets 124', 126' may be formed of an aluminum sheet with or without a seal 125 formed of a different material (i.e., elastomer, etc.) being positioned between two portions of the aluminum sheet.

In various embodiments, oil pan assembly 12, 12' may further include an oil pickup or suction tube, which may be cast into the oil pan assembly. Additionally, oil pan assembly may also include a drain plug and/or an oil level sensor. Furthermore, load bearing components such as loader arms, brackets such as exhaust after-treatment support, oil filler caps or oil fill tubes, lube gauges or dipstick, and/or windage plates or oil scrapers may also be mounted to oil pan assembly 12, 12' in various embodiments.

Although the present disclosure refers to embodiments incorporated into a tractor, it should be noted that embodiments of the present disclosure may be incorporated into other vehicles, such as trucks, cars, and all-terrain vehicles. In addition, while couplings may be shown coupled through openings in one direction, it should be noted that the couplings may be coupled in either direction.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. An oil pan assembly for an agricultural tractor, comprising:
   a first portion including an inner set of openings configured to receive a first set of fasteners to couple the first portion to an engine block; and
   a second portion including an outer set of openings positioned laterally outward relative to the inner set of openings and configured to receive a second set of fasteners to couple the second portion to the first portion and the engine block.

2. The oil pan assembly of claim 1, wherein at least one of the first portion and the second portion are further coupled to at least one of an axle carrier and a flywheel housing.

3. The oil pan assembly of claim 1, wherein at least one of the first portion and the second portion are further coupled to at least one of an axle carrier and a transmission.

4. The oil pan assembly of claim 1, wherein the first portion further includes a first end, a second end and a middle section, the middle section having a width less than a width of the first end and less than a width of the second end.

5. The oil pan assembly of claim 1, wherein the second portion further includes a first end, a second end and a middle section, the middle section having a width less than at least one of a width of the first end of the second portion and a width of the second end of the second portion.

6. The oil pan assembly of claim 1, wherein the first portion further includes an interior portion having a plurality of openings.

7. An oil pan assembly, comprising:
   a first portion coupled to an engine block, an axle carrier and at least one of a flywheel housing and a transmission of a powertrain; and
   a second portion coupled to the first portion, the engine block, the axle carrier and the at least one of the flywheel housing and the transmission.

8. The oil pan assembly of claim 7, wherein the first portion is coupled to the engine block, the axle carrier and the flywheel housing.

9. The oil pan assembly of claim 7, wherein the first portion is coupled to the engine block, the axle carrier and the transmission.

10. The oil pan assembly of claim 7, wherein the second portion is coupled to the engine block, the axle carrier and the flywheel housing.

11. The oil pan assembly of claim 7, wherein the second portion is coupled to the engine block, the axle carrier and the transmission.

12. The oil pan assembly of claim 7, wherein the first portion includes an interior portion having a plurality of openings.

13. The oil pan assembly of claim 7, wherein the first portion includes a first end having at least a portion extending away from the first portion.

14. The oil pan assembly of claim 13, wherein the first end of the first portion has a U-shaped cross-section.

15. A powertrain assembly, comprising:
   an engine including an engine block;
   an axle carrier positioned forward of the engine;
   at least one of a flywheel housing and a transmission; and
   an oil pan assembly including a first portion and a second portion, wherein the first portion and the second portion are coupled to the engine block, the axle carrier and the at least one of the flywheel housing and the transmission.

16. The powertrain assembly of claim 15, wherein the flywheel housing is positioned rearward of the engine.

17. The powertrain assembly of claim 15, wherein the transmission is positioned rearward of the engine.

18. The powertrain assembly of claim 15, wherein the first portion is positioned between the engine block and the second portion.

19. The powertrain assembly of claim 15, wherein the first portion of the oil pan assembly includes an interior portion having a plurality of openings.

20. The powertrain assembly of claim 15, wherein a first end of the first portion has a U-shaped cross-section.

* * * * *